US012561482B2

(12) United States Patent
Yu et al.

(10) Patent No.: US 12,561,482 B2
(45) Date of Patent: *Feb. 24, 2026

(54) CHARTER-BASED ACCESS CONTROLS FOR MANAGING COMPUTER RESOURCES

(71) Applicant: Palantir Technologies Inc., Denver, CO (US)

(72) Inventors: Alice Yu, San Francisco, CA (US); Emily Wang, New York, NY (US); Yeong Wei Wee, London (GB)

(73) Assignee: Palantir Technologies Inc., Denver, CO (US)

( * ) Notice: Subject to any disclaimer, the term of this patent is extended or adjusted under 35 U.S.C. 154(b) by 33 days.

This patent is subject to a terminal disclaimer.

(21) Appl. No.: 18/731,690

(22) Filed: Jun. 3, 2024

(65) Prior Publication Data

US 2025/0278519 A1 Sep. 4, 2025

Related U.S. Application Data

(63) Continuation of application No. 18/325,813, filed on May 30, 2023, now Pat. No. 12,039,087, which is a
(Continued)

(51) Int. Cl.
G06F 21/62 (2013.01)
G06F 21/31 (2013.01)
H04L 9/40 (2022.01)

(52) U.S. Cl.
CPC ............ *G06F 21/629* (2013.01); *G06F 21/31* (2013.01); *H04L 63/107* (2013.01)

(58) Field of Classification Search
CPC ..... H04L 63/107; H04L 63/20; H04L 63/101; G06F 21/629; G06F 21/31
See application file for complete search history.

(56) References Cited

U.S. PATENT DOCUMENTS 5,263,158 A 11/1993 Janis
5,978,475 A 11/1999 Schneier et al.
(Continued)

FOREIGN PATENT DOCUMENTS

CN 101729531 6/2010
CN 103281301 9/2013
(Continued)

OTHER PUBLICATIONS

Gori, Julien, Han L. Han, and Michel Beaudouin-Lafon. "FileWeaver: Flexible file management with automatic dependency tracking." Proceedings of the 33rd Annual ACM Symposium on User Interface Software and Technology. 2020, pp. 22-34. (Year: 2020).*
(Continued)

*Primary Examiner* — Kari L Schmidt
(74) *Attorney, Agent, or Firm* — Knobbe, Martens, Olson & Bear, LLP

(57) ABSTRACT

A system and method can provide charter-based access to resources using an object model. Charters are defined by an administrator to have certain markings, each marking indicating a control (e.g., permission, credential, qualification, constraint, requirement, etc.) that regulates work under the charter. Users are also associated with markings. A user starts a session to access the system and is authenticated. The system determines charters having markings that the user has, and these charters are provided to the user to select from. Selecting a charter allows the user access to resources associated with the charter, under the controls indicated by the markings. Charters, controls, qualifications, resources, authorizations and links between them can be implemented using an object model. Markings can control session parameters (e.g., geographic location), resource access, user credentials, qualifications, and/or data processing permissions
(Continued)

for a group of users, simplifying project definition and revisions to controlling access under the charter.

20 Claims, 9 Drawing Sheets

Related U.S. Application Data continuation of application No. 16/563,133, filed on Sep. 6, 2019, now Pat. No. 11,704,441.

(60) Provisional application No. 62/895,350, filed on Sep. 3, 2019.

(56) References Cited

U.S. PATENT DOCUMENTS

| | | | |
|---|---|---|---|
| 6,029,195 A | 2/2000 | Herz | |
| 6,202,066 B1 | 3/2001 | Barkley et al. | |
| 6,292,798 B1 | 9/2001 | Dockter et al. | |
| 6,487,665 B1 | 11/2002 | Andrews et al. | |
| 6,725,240 B1 | 4/2004 | Asad et al. | |
| 6,735,701 B1 | 5/2004 | Jacobson | |
| 6,807,569 B1 | 10/2004 | Bhimani et al. | |
| 7,017,046 B2 | 3/2006 | Doyle et al. | |
| 7,069,586 B1 | 6/2006 | Winneg et al. | |
| 7,225,468 B2 | 5/2007 | Waisman et al. | |
| 7,249,374 B1 | 7/2007 | Lear et al. | |
| 7,596,285 B2 | 9/2009 | Brown et al. | |
| 7,770,032 B2 | 8/2010 | Nesta et al. | |
| 7,801,871 B2 * | 9/2010 | Gosnell | G06F 21/6218 |
| | | | 707/698 |
| 7,962,495 B2 | 6/2011 | Jain et al. | |
| 8,181,253 B1 | 5/2012 | Zaitsev et al. | |
| 8,190,893 B2 | 5/2012 | Benson et al. | |
| 8,196,184 B2 | 6/2012 | Amirov et al. | |
| 8,239,668 B1 | 8/2012 | Chen et al. | |
| 8,301,904 B1 | 10/2012 | Gryaznov | |
| 8,312,546 B2 | 11/2012 | Alme | |
| 8,429,708 B1 | 4/2013 | Tandon | |
| 8,646,080 B2 | 2/2014 | Williamson et al. | |
| 8,683,322 B1 | 3/2014 | Cooper | |
| 8,726,379 B1 | 5/2014 | Stiansen et al. | |
| 8,769,412 B2 | 7/2014 | Gill et al. | |
| 8,782,794 B2 | 7/2014 | Ramcharran | |
| 8,793,489 B2 | 7/2014 | Polunin et al. | |
| 8,931,043 B2 | 1/2015 | Cooper et al. | |
| 9,021,260 B1 | 4/2015 | Falk et al. | |
| 9,049,117 B1 | 6/2015 | Nucci et al. | |
| 9,100,428 B1 | 8/2015 | Visbal | |
| 9,280,646 B1 | 3/2016 | Nandyalam et al. | |
| 9,335,897 B2 | 5/2016 | Goldenberg | |
| 9,338,013 B2 | 5/2016 | Castellucci et al. | |
| 9,582,780 B1 | 2/2017 | Curcic et al. | |
| 9,888,039 B2 | 2/2018 | Elliot et al. | |
| 10,255,415 B1 | 4/2019 | Siavoshy et al. | |
| 10,476,965 B1 | 11/2019 | Gray | |
| 10,860,698 B2 | 12/2020 | Siavoshy et al. | |
| 11,107,022 B2 | 8/2021 | Dhandapani et al. | |
| 11,693,982 B2 | 7/2023 | Bregman et al. | |
| 11,704,441 B2 | 7/2023 | Yu et al. | |
| 11,914,687 B2 | 2/2024 | Siavoshy et al. | |
| 12,039,087 B2 | 7/2024 | Yu et al. | |
| 12,141,253 B2 | 11/2024 | Siavoshy et al. | |
| 2002/0112157 A1 | 8/2002 | Doyle et al. | |
| 2002/0116642 A1 | 8/2002 | Joshi et al. | |
| 2002/0144142 A1 * | 10/2002 | Shohat | G06F 21/6218 |
| | | | 726/4 |
| 2003/0018786 A1 | 1/2003 | Lortz | |
| 2003/0046576 A1 * | 3/2003 | High, Jr. | H04L 63/20 |
| | | | 726/1 |
| 2003/0088520 A1 * | 5/2003 | Bohrer | G06Q 10/10 |
| | | | 705/74 |
| 2003/0167269 A1 | 9/2003 | Gupta | |
| 2004/0010607 A1 | 1/2004 | Lee et al. | |

| | | | |
|---|---|---|---|
| 2004/0064724 A1 * | 4/2004 | Himmel | H04L 63/105 |
| | | | 713/185 |
| 2004/0098594 A1 | 5/2004 | Fleming et al. | |
| 2004/0123139 A1 | 6/2004 | Aiello et al. | |
| 2004/0153418 A1 | 8/2004 | Hanweck | |
| 2004/0250124 A1 | 12/2004 | Chesia et al. | |
| 2005/0157662 A1 | 7/2005 | Bingham et al. | |
| 2005/0229256 A2 | 10/2005 | Banzhof | |
| 2005/0262549 A1 * | 11/2005 | Ritt | H04L 63/083 |
| | | | 726/1 |
| 2005/0262556 A1 | 11/2005 | Waisman et al. | |
| 2005/0275638 A1 | 12/2005 | Kolmykov-Zotov et al. | |
| 2006/0031928 A1 | 2/2006 | Conley et al. | |
| 2006/0069912 A1 | 3/2006 | Zheng et al. | |
| 2006/0212931 A1 | 9/2006 | Shull et al. | |
| 2006/0218394 A1 | 9/2006 | Yang | |
| 2006/0218637 A1 | 9/2006 | Thomas et al. | |
| 2006/0236380 A1 | 10/2006 | Bransom et al. | |
| 2006/0265747 A1 | 11/2006 | Judge | |
| 2006/0294580 A1 | 12/2006 | Yeh, Jr. | |
| 2007/0056019 A1 * | 3/2007 | Allen | G06Q 10/06 |
| | | | 726/1 |
| 2007/0143851 A1 | 6/2007 | Nicodemus | |
| 2007/0214497 A1 | 9/2007 | Montgomery et al. | |
| 2007/0220479 A1 | 9/2007 | Hughes | |
| 2007/0233685 A1 | 10/2007 | Burns et al. | |
| 2007/0245409 A1 | 10/2007 | Harris et al. | |
| 2007/0271157 A1 | 11/2007 | Rosenberg | |
| 2007/0294766 A1 | 12/2007 | Mir et al. | |
| 2008/0104407 A1 | 5/2008 | Horne et al. | |
| 2008/0201580 A1 | 8/2008 | Savitzky et al. | |
| 2008/0222706 A1 | 9/2008 | Renaud et al. | |
| 2008/0229422 A1 | 9/2008 | Hudis et al. | |
| 2009/0103442 A1 | 4/2009 | Douville | |
| 2009/0119392 A1 | 5/2009 | Bonjour et al. | |
| 2009/0228701 A1 | 9/2009 | Lin | |
| 2009/0319529 A1 | 12/2009 | Bartlett et al. | |
| 2009/0328222 A1 | 12/2009 | Helman et al. | |
| 2010/0077481 A1 | 3/2010 | Polyakov et al. | |
| 2010/0100963 A1 | 4/2010 | Mahaffey | |
| 2010/0125612 A1 | 5/2010 | Amradkar et al. | |
| 2010/0235915 A1 * | 9/2010 | Memon | H04L 63/145 |
| | | | 709/224 |
| 2010/0262688 A1 | 10/2010 | Hussain et al. | |
| 2010/0330801 A1 | 12/2010 | Rouh | |
| 2011/0060910 A1 | 3/2011 | Gormish et al. | |
| 2011/0202555 A1 | 8/2011 | Cordover et al. | |
| 2011/0219450 A1 | 9/2011 | McDougal et al. | |
| 2011/0251906 A1 | 10/2011 | Loevenguth et al. | |
| 2012/0079592 A1 | 3/2012 | Pandrangi | |
| 2012/0084866 A1 | 4/2012 | Stolfo | |
| 2012/0110674 A1 | 5/2012 | Belani et al. | |
| 2012/0169593 A1 | 7/2012 | Mak et al. | |
| 2012/0218305 A1 | 8/2012 | Patterson et al. | |
| 2012/0254129 A1 | 10/2012 | Wheeler et al. | |
| 2012/0278901 A1 * | 11/2012 | Bunter | G07C 9/38 |
| | | | 726/28 |
| 2012/0284791 A1 | 11/2012 | Miller et al. | |
| 2012/0330801 A1 | 12/2012 | McDougal et al. | |
| 2013/0019306 A1 | 1/2013 | Lagar-Cavilla et al. | |
| 2013/0097709 A1 | 4/2013 | Basavapatna et al. | |
| 2013/0132854 A1 | 5/2013 | Raleigh et al. | |
| 2013/0139268 A1 * | 5/2013 | An | G06F 21/6263 |
| | | | 726/26 |
| 2013/0191339 A1 | 7/2013 | Haden et al. | |
| 2013/0239217 A1 | 9/2013 | Kindler et al. | |
| 2013/0295975 A1 | 11/2013 | Johnson et al. | |
| 2014/0032759 A1 | 1/2014 | Barton et al. | |
| 2014/0040979 A1 | 2/2014 | Barton et al. | |
| 2014/0059683 A1 | 2/2014 | Ashley | |
| 2014/0075492 A1 | 3/2014 | Kapadia et al. | |
| 2014/0090026 A1 | 3/2014 | Mishra et al. | |
| 2014/0123279 A1 | 5/2014 | Bishop et al. | |
| 2014/0143009 A1 | 5/2014 | Brice et al. | |
| 2014/0173712 A1 * | 6/2014 | Ferdinand | H04L 63/0236 |
| | | | 726/11 |
| 2014/0173738 A1 | 6/2014 | Condry et al. | |

(56) References Cited

U.S. PATENT DOCUMENTS

| | | | | |
|---|---|---|---|---|
| 2014/0188895 A1* | 7/2014 | Wang | G06F 16/335 | |
| | | | 707/748 | |
| 2014/0214468 A1 | 7/2014 | Wurtele et al. | | |
| 2014/0229422 A1 | 8/2014 | Jain et al. | | |
| 2014/0366132 A1 | 12/2014 | Stiansen et al. | | |
| 2015/0026208 A1 | 1/2015 | Kuhmuench | | |
| 2015/0039565 A1* | 2/2015 | Lucas | H04L 63/10 | |
| | | | 707/667 | |
| 2015/0128274 A1 | 5/2015 | Giokas | | |
| 2015/0188715 A1 | 7/2015 | Castelluci et al. | | |
| 2015/0229664 A1 | 8/2015 | Hawthorn et al. | | |
| 2015/0248563 A1 | 9/2015 | Alfarano et al. | | |
| 2015/0248651 A1 | 9/2015 | Akutagawa et al. | | |
| 2015/0261847 A1* | 9/2015 | Ducott, III | G06F 16/8358 | |
| | | | 707/737 | |
| 2015/0326601 A1 | 11/2015 | Grondin et al. | | |
| 2016/0004864 A1 | 1/2016 | Falk et al. | | |
| 2016/0028759 A1 | 1/2016 | Visbal | | |
| 2016/0044132 A1 | 2/2016 | Croft | | |
| 2016/0112397 A1 | 4/2016 | Mankovskii | | |
| 2016/0255087 A1 | 9/2016 | Smith | | |
| 2016/0283406 A1 | 9/2016 | Linga et al. | | |
| 2017/0359379 A1 | 12/2017 | Elliot et al. | | |
| 2018/0077542 A1 | 3/2018 | Xie et al. | | |
| 2018/0375791 A1* | 12/2018 | Kaladgi | H04L 47/821 | |
| 2020/0007455 A1 | 1/2020 | Chhabra et al. | | |
| 2020/0145424 A1 | 5/2020 | Chen | | |
| 2021/0056185 A1 | 2/2021 | Siavoshy et al. | | |
| 2023/0129276 A1 | 4/2023 | Satake et al. | | |
| 2023/0306138 A1 | 9/2023 | Yu et al. | | |
| 2023/0342179 A1 | 10/2023 | Suttle et al. | | |
| 2024/0160705 A1 | 5/2024 | Siavoshy et al. | | |
| 2025/0028795 A1 | 1/2025 | Siavoshy et al. | | |

FOREIGN PATENT DOCUMENTS

| | | |
|---|---|---|
| EP | 1962222 | 8/2008 |
| EP | 2892197 | 7/2015 |
| EP | 2897051 | 7/2015 |
| EP | 2963578 | 1/2016 |
| EP | 2985974 | 2/2016 |
| EP | 3188069 | 7/2017 |
| EP | 3550791 | 10/2019 |
| EP | 3789899 | 3/2021 |
| EP | 4290400 | 12/2023 |
| EP | 4446924 | 10/2024 |
| NL | 2011642 | 8/2015 |
| WO | WO 2005/010685 | 2/2005 |
| WO | WO 2016/123359 | 8/2016 |

OTHER PUBLICATIONS

T. Ahmed, F. Patwa and R. Sandhu, "Object-to-Object Relationship-Based Access Control: Model and Multi-Cloud Demonstration (Invited Paper)," 2016 IEEE 17th International Conference on Information Reuse and Integration (IRI), Pittsburgh, PA, USA, 2016, pp. 297-304. (Year: 2016).*

Official Communication for European Patent Application No. 20193929.5 dated Oct. 4, 2024, 2 pages.

Official Communication for European Patent Application No. 24190872.2 dated Nov. 29, 2024, 12 pages.

Alagar et al., "Uniform Service Description and Contextual Access Control for Trustworthy Cloud Computing," 2018 International Conference on Cloud Computing, Big Data and Blockchain (ICCBB), 2018, pp. 1-7.

Almorsy et al., "TOSSMA: A tenant-oriented SaaS security management architecture", 2012 IEEE Fifth International Conference on Cloud Computing, Honolulu, HI, USA, pp. 981-988 (2012).

Baker et al., "The Development of a Common Enumeration of Vulnerabilities and Exposures," Presented at the Second International Workshop on Recent Advances in Intrusion Detection, Sep. 7-9, 1999, pp. 35.

Bhuyan et al., "Network Anomaly Detection: Methods, Systems and Tools," First Quarter 2014, IEEE, 34 pages.

Crosby et al., "Efficient Data Structures for Tamper-Evident Logging," Department of Computer Science, Rice University, 2009, pp. 17.

Filho et al., "A generalized context-based access control model for pervasive environments."; Proceedings of the 2nd SIGSPATIAL ACM GIS 2009 International Workshop on Security and Privacy in GIS and LBS. 2009, pp. 12-21.

FireEye—Products and Solutions Overview, <http://www.fireeye.com/products-and-solutions> Printed Jun. 30, 2014 in 3 pages.

FireEye, <http://www.fireeye.com/> Printed Jun. 30, 2014 in 2 pages.

Glaab et al., "EnrichNet: Network-Based Gene Set Enrichment Analysis," Bioinformatics 28.18 (2012): pp. i451-i457.

He et al., "Role security access control of the distributed object systems," 2014 11th International Computer Conference on Wavelet Actiev Media Technology and Information Processing(ICCWAMTIP), 2014, pp. 389-392.

Hur et al., "SciMiner: web-based literature mining tool for target identification and functional enrichment analysis," Bioinformatics 25.6 (2009): pp. 838-840.

Lee et al., "A Data Mining and CIDF Based Approach for Detecting Novel and Distributed Intrusions," Lecture Notes in Computer Science, vol. 1907, Nov. 11, 2000, pp. 49-65.

Ma et al., "A New Approach to Secure Logging," ACM Transactions on Storage, vol. 5, No. 1, Article 2, Published Mar. 2009, 21 pages.

Schneier et al., "Automatic Event Stream Notarization Using Digital Signatures," Security Protocols, International Workshop Apr. 1996 Proceedings, Springer-Veriag, 1997, pp. 155-169, https://schneier.com/paper-event-stream.pdf.

Schneier et al., "Cryptographic Support for Secure Logs on Untrusted Machines," The Seventh USENIX Security Symposium Proceedings, USENIX Press, Jan. 1998, pp. 53-62, https://www.schneier.com/paper-secure-logs.pdf.

VirusTotal—About, <http://www.virustotal.com/en/about/> Printed Jun. 30, 2014 in 8 pages.

Wang, "Team-and-role-based organizational context and access control for cooperative hypermedia environments", Proceedings of the tenth ACM Conference on Hypertext and hypermedia: returning to our diverse roots: returning to our diverse roots, pp. 37-46 (1999).

Waters et al., "Building an Encrypted and Searchable Audit Log," Published Jan. 9, 2004, 11 pages, http://www.parc.com/content/attachments/building_encrypted_searchable_5059_parc.pdf.

Xu et al., "SparkAC: Fine-grained access control in spark for secure data sharing and analytics", in IEEE Transactions on Dependable and Secure Computing, vol. 20(2):1104-1123 (2023).

Zheng et al., "GOEAST: a web-based software toolkit for Gene Ontology enrichment analysis," Nucleic acids research 36.suppl 2 (2008): pp. W385-W363.

Screenshot of USPTO log-in and authentication pages, retrieved on Sep. 24, 2018, in 3 pages.

Official Communication for European Patent Application No. 18180766.0 dated Oct. 8, 2018, 7 pages.

Official Communication for European Patent Application No. 18180766.0 dated Oct. 28, 2021, 6 pages.

Official Communication for European Patent Application No. 18180766.0 dated Jun. 30, 2022, 5 pages.

Official Communication for European Patent Application No. 18180766.0 dated Jan. 3, 2023, 5 pages.

Official Communication for European Patent Application No. 20193929.5 dated Dec. 11, 2020, 9 pages.

Official Communication for European Patent Application No. 23206015.2 dated Feb. 6, 2024, 9 pages.

Official Communication for European Patent Application No. 20193929.5 dated Apr. 23, 2024, 9 pages.

* cited by examiner

CHARTER-BASED ACCESS CONTROLS FOR MANAGING COMPUTER RESOURCES

REFERENCE TO PRIORITY APPLICATIONS

This application is a continuation of U.S. patent application Ser. No. 18/325,813, filed May 30, 2023, and titled "CHARTER-BASED ACCESS CONTROLS FOR MANAGING COMPUTER RESOURCES", which is a continuation of U.S. patent application Ser. No. 16/563,133, filed Sep. 6, 2019, and titled "CHARTER-BASED ACCESS CONTROLS FOR MANAGING COMPUTER RESOURCES", which application claims the benefit of U.S. Provisional Application No. 62/895,350, filed Sep. 3, 2019, and titled "CHARTER-BASED ACCESS CONTROLS FOR MANAGING COMPUTER RESOURCES." The entire disclosure of each of the above items is hereby made part of this specification as if set forth fully herein and incorporated by reference for all purposes, for all that it contains.

Any and all applications for which a foreign or domestic priority claim is identified in the Application Data Sheet as filed with the present application are hereby incorporated by reference under 37 CFR 1.57.

TECHNICAL FIELD

The present disclosure relates to controlling access to computer resources. More specifically, the present disclosure includes controlling access, for example by managing and auditing access to computer resources using context-based and/or role-based charters.

BACKGROUND

A background is provided for introductory purposes and to aid the reader in understanding the detailed description. The background should not be taken as an admission of any prior art to the claims.

Some computer systems limit access to computer resources by requiring authentication credentials, such as a username and password. Some computer systems also impose authorization restrictions that specify which user or groups of users can read, write, or modify a resource.

However, these computer systems can be insufficient for protecting and auditing access to computer resources. Typically, a user is granted the maximum level of permissions each time they log in to a session such that the user operates with the totality of their respective permissions during the session. Furthermore, the use of authentication credentials and authorization restrictions, without more, can be inefficient and take large amounts of time, data and memory to administer, especially when making large scale changes. Authentication credentials and authorization restrictions may also be insufficient for protecting private or confidential computer resources.

SUMMARY

Various embodiments of the computer system can include, one, all, or any combination of features of this paragraph. A computer system can include one or more computer readable storage devices configured to store a plurality of charter objects each associated with respective charters, the plurality of charter objects including at least a first charter object associated with a first charter having a first group of one or more markings, each charter object linked to at least one control object associated with a control for a user operating in a session under the charter, each of the at least one control object associated with a user based on least one marking of the first group of one or more markings, a plurality of resource objects representing computer resources including a first resource object representing a first computer resource, the first resource object linked to at least the first charter object, a first user object representing a first user, the first user object including one or more markings associated with the first user, and a plurality of computer readable instructions. The system can also include one or more processors configured to execute the plurality of computer readable instructions to cause the computer system to perform operations including: receiving an authentication credential provided by the first user, authenticating the first user for a session based at least in part on the authentication credential, providing to the first user a selection of one or more charters based on the one or more markings of the first user object, the one or more charters including the first charter receiving, from the first user, an indication of a selection of the first charter, determining controls associated with at least one control object linked to the first charter object, and based at least in part on the indication of the selection of the first charter, and based at least in part on the first charter object being linked to the first resource object, and further based on the at least on one control object linked to the first charter object, providing the first user access to the first computer resource to operate in accordance with a set of controls associated with the first charter.

Further, the interactive and dynamic user interfaces described herein are enabled by innovations in efficient interactions between the user interfaces and underlying systems and components. For example, disclosed herein are improved methods of receiving user inputs, translation and delivery of those inputs to various system components, automatic and dynamic execution of complex processes in response to the input delivery, automatic interaction among various components and processes of the system, and automatic and dynamic updating of the user interfaces. The interactions and presentation of data via the interactive user interfaces described herein may accordingly provide cognitive and ergonomic efficiencies and advantages over previous systems.

Various embodiments of the present disclosure provide improvements to various technologies and technological fields. For example, as described above, existing data storage and processing technology (including, e.g., in memory databases) is limited in various ways (e.g., manual data review is slow, costly, and less detailed; data is too voluminous; etc.), and various embodiments of the disclosure provide significant improvements over such technology. Additionally, various embodiments of the present disclosure are inextricably tied to computer technology. In particular, various embodiments rely on detection of user inputs via graphical user interfaces, calculation of updates to displayed electronic data based on those user inputs, automatic processing of related electronic data, and presentation of the updates to displayed images via interactive graphical user interfaces. Such features and others (e.g., processing and analysis of large amounts of electronic data) are intimately tied to, and enabled by, computer technology, and would not exist except for computer technology. For example, the interactions with displayed data described below in reference to various embodiments cannot reasonably be performed by humans alone, without the computer technology upon which they are implemented. Further, the implementation of the various embodiments of the present disclosure via computer technology enables many of the advantages described herein, including more efficient interaction with, and presentation of, various types of electronic data.

Additional embodiments of the disclosure are described below in reference to the appended claims, which may serve as an additional summary of the disclosure.

In various embodiments, systems and/or computer systems are disclosed that comprise a computer readable storage medium having program instructions embodied therewith, and one or more processors configured to execute the program instructions to cause the one or more processors to perform operations comprising one or more aspects of the above- and/or below-described embodiments (including one or more aspects of the appended claims).

In various embodiments, computer-implemented methods are disclosed in which, by one or more processors executing program instructions, one or more aspects of the above-and/or below-described embodiments (including one or more aspects of the appended claims) are implemented and/or performed.

In various embodiments, computer program products comprising a computer readable storage medium are disclosed, wherein the computer readable storage medium has program instructions embodied therewith, the program instructions executable by one or more processors to cause the one or more processors to perform operations comprising one or more aspects of the above- and/or below-described embodiments (including one or more aspects of the appended claims).

DETAILED DESCRIPTION

Overview

Figure 1:
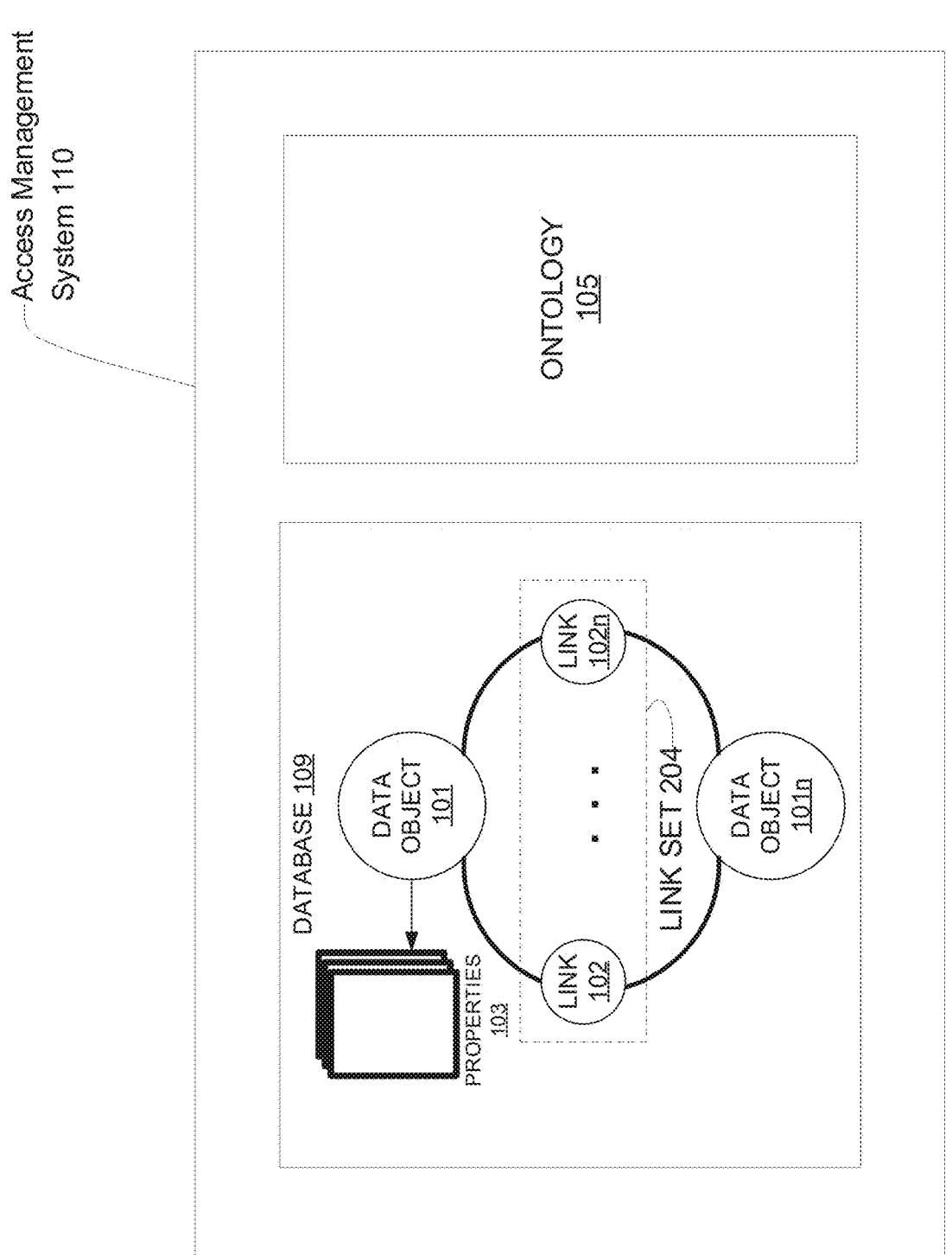
FIG. 1 shows an object-centric conceptual data model according to an embodiment.

Access to computer resources is managed by assigning authentication credentials (e.g., usernames and passwords) to users. Computer administrators may further impose authorizations specifying which users, or groups of users, can read, write, or modify one or more resources. In addition, some systems allow access to be granted based on a user-specified use case. User access to resources is provided at the maximum level of their authorized permission each time they log in. To add more granular controls, access systems can efficiently propagate large scale authorization changes to provide for purpose-based or context-based implementations obviating the need for an administrator to manually change each permission of each resource or the authorization permissions of each user. Such systems allow a group of users to operate with a subset rather than a totality of their authorized permissions, and adhere to certain requirement or regulatory contexts required for resource access in certain data processing implementations. Further, such access systems overcome the difficulty to track or report a group of users access to authorized resources, and to track or ensure that a group of users are qualified to access authorized resources.

A system can be used to manage access to computer resources. Charters are defined to have sets of rules ("controls") that govern a group of one or more resources that are accessed by a group of one or more users for data processing operations. Charters can be, for example, purpose-based and/or context-based. For example, a charter can be defined for a project such as "hiring" personnel. Each charter is associated with at least one system resource. Charters allow resources to be easily grouped together for certain data processing purposes, manage which users are able to access the group of resources, and provide controls for conducting processing with the group of resources under (or in accordance with) the charter.

To access a computer resource in a data processing system, a user may provide authentication credentials for a data processing session. If the user is authenticated, then an access management service can determine what charters the user can access and provide the user a selection of one or more charters to select. Controls associated with a selected charter are applied to the user's session. The controls provide more precise (or granular) control over the use of the resources.

The controls associated with a charter can dictate data access or processing permissions, constraints, qualifications, authorizations, and the like for a group of users accessing computer resources while conducting data processing under the charter for a session. Controls associated with a charter can limit a user to operate with a subset, rather than the totality, of the permissions the user has been granted. In one example, controls can limit a user's access to a resource based on the user's geographical location, (e.g., a user session must be in the United States to access a certain resource). In another example, controls can limit the data processing tasks a user can conduct (e.g., a user may access dataset A and dataset B, but is not allowed to join information from dataset A with dataset B). In one example, a control can limit a user's access to data that is available on a resource associated with the charter based on a classification level dictated by the charter. That is, even if a user has access to "top-secret" level data based on the user's highest clearance level, the scope of the user's data processing task under a particular charter may be limited to a "secret" level and therefore top-secret level data cannot be accessed when the user is working under that charter. In another example, the controls may limit the user's access to data on a resource based on the purpose of the charter, as some data may only be used for certain purposes.

In another example, controls can impose requirements on the user that have to be met before the user has access to the resource. For example, a control can require an access management service to determine whether the user has a "qualification," or acknowledged agreement with a condition (an "authorization"). As used herein in, an "authorization" can generally refer to a condition that a user must agree to (e.g., acknowledge) before gaining access to a systems resource associated with a charter (e.g., user signs policy x, user acknowledges they have read and agree to restriction of use y). A "qualification" can be a type of credential that a user needs to achieve (complete) before gaining access to a systems resource associated with a charter (e.g., a user completing training z). Each authorization and qualification can be distinct from one another. Each authorization and qualification may be associated with multiple charters. An authorization and/or a qualification may be required when a user logs in and selects a certain charter-thus, an authorization and/or a qualification may be necessary each time the user logs in to a new session, or into a new charter, or renewed after a certain period of time. For example, a user may be required to complete diversity training once a year. The completion of the training can be stored in an object associated with the user with a time stamp so it can be determined when the user needs the training again. Each required authorization and qualification may be indicated by one or more control indicia associated with the charter, the control indicia referred to herein as "markings."

An administrator can define a relevant set of one or more charters. There are various types of one or more controls (e.g., permissions and restrictions) the administrator can impose on a user when using a particular system resource under a charter. In an implementation of an access management system, each charter is associated with a group of markings, each marking indicative of a control associated with the charter. For example, controls associated with using resources while working under the charter. The markings associated with a charter can be defined by an administrator. The markings for a charter can be changed by the administrator to control the use of each system resource for the group of users accessing the system resources under the charter. The controls indicated by the markings are applied at each user session (e.g., user login). The controls associated with the charter can be updated by the administrator at any time, and updated controls can be applied to the user the next time the user starts another session to work under the charter. This allows controls for one or more system resources to be easily and consistently controlled for everyone in the group working under a charter. At log in, users are prompted to select a charter for their session. Users can only select a charter if the user has all of the markings defined for the particular charter. Thus, for the user to be able to select a charter, a group of markings that are required for working under the charter may be a subset of a group of marking associated with a user, but the group of markings associated with a user cannot be a subset of the markings required to work under the charter.

Resources, charters, controls, authorizations, qualifications, and users can all be implemented as data objects in the access management system. The objects are each associated with various properties, and may be linked to one another. For example, a charter data object may be linked to one or more control data objects, and each charter data object maybe linked to one or more resource objects. By using the object model, administrators can more easily make and propagate large scale changes a charter and its associated users and resources, compared to, for example, individual editing of user's permissions, editing individual resource permission, or tracking access in spreadsheets.

Each charter corresponds to a charter object which is linked to one or more resource objects, one or more user objects, and one or more control objects, as indicated by the markings associated with the charter object. In a workflow, a user logs in for a work session, and once the user is authenticated (based in part on an user object associated with the user), and the user is prompted to select a charter(s) for the session. Users will be provided one or more charters to select from at each session. The selection of charters provided to each user can be based on whether the user object includes all the markings of the charter object. Control objects linked to the charter object may require a user to fulfill a qualification or complete an authorization. Control objects linked to the charter object can control permissions and constraints of the user's session. When the user logs out at the end of the session, the permissions for that session are revoked. Future logins of the user to work under a charter can require re-selection of a charter, re-application of the mandatory controls for the session, and can include re-fulfilling any qualifications and authorizations.

An auditing service can log, on a data storage device, for each resource access, a time, user information, and the charter the user is working under, thus logging what was accessed by who, and why such access was performed. The systems described herein also ensure that users access only the resources associated with the charter. The systems described herein can also log the qualifications and authorizations of the users. The log can be used to generate reports for auditing. Retention of logs and/or data objects used during a session can be dictated by the charter. Using these methods, administrators can group together categories of resources that will be pertinent for certain processing purposes, manage and control which users access to resources under a given charter, and can audit and retain logs for a group of users on a per-charter basis.

A computer system or software framework is provided for charter-based permissioning within an organization. The system data permissioning is based on a user's selected charter, in additional to authentication, qualifications, authorization, and other controls. An organization may establish charters associated with access to resources (for example, a file, dataset, a folder, a RSA token, a database, stored information, or a physical item such as a processor, a drive, a memory device, a computer, a laptop, a phone, a client, a badge, or a room).

A charter's controls govern access to resources when the users are accessing resources and performing data processing during a session under a selected charter. The controls imposed on a group of users under a first charter can be different than the controls imposed on the same group of users under a second charter, such that the users can have certain permissions for processing related to a first resource under one charter, and the same users can have different permissions for processing related to the first resource under the second charter. This can be done without changing the totality of the permissions associated with a user. Instead, the controls of each charter are defined to permit the desired access or processing.

The system can track each user's access of a resource and logs the associated charter under which the resource is accessed. Information related to a user's session can be logged, for example, user's location, computer used to login for the session, and/or the date/time of the resource access. The log can be used to generate reports documenting the users access to the resources, and instances that access is denied, for example, due to a control not being satisfied when trying to access a resource. The system can also include update qualifications and/or authorizations of users when a user completes training, inputs additional qualifications, or agrees to a condition. Markings associated with a charter, that indicate controls associated with the charter, can be created and applied to (or associated with) the charter. For example, a charter object associated with the charter can include the markings (as shown, for example, in the FIG. 8 "Hiring" charter object 801 instance in the Markings field). The controls related to the markings can be related to accessing a certain resource, controls related to accessing a group of resources, controls related to the purpose of the charter, and/or controls related to the user's session (e.g., the location of the user, the time of access, date or access, a number of accesses within a certain period, an IP address, the computer system used for accessing a resource, and the like).

An administrator with appropriate system privileges may define a charter. Such a charter administrator may change a control, a qualification, an authorization, and/or a resource associated with a charter, thus controlling criteria and controls for accessing one or more resources associated with a charter without changing individual user permissions or accesses. In some embodiments, the charter administrator does not change user objects or determine the markings that are associated with the user objects, instead such tasks may be conducted by another administrator. Thus, a charter administrator can have a high degree of granularity in controlling user's access to charter associated resources for data processing without themselves changing permissions of the users for every charter. In some embodiments, a particular marking can be associated with a charter and such a marking can also be associated with selected user objects to provide more control of users access to work under a charter.

Terms

In order to facilitate an understanding of the systems and methods discussed herein, a number of terms are defined below. The terms defined below, as well as other terms used herein, should be construed to include the provided definitions, the ordinary and customary meaning of the terms, and/or any other implied meaning for the respective terms. Thus, the definitions below do not limit the meaning of these terms, but only provide exemplary definitions.

Computer Resource or Resource: Any data, hardware, or physical item. May include data and items that can be accessed by a user through a computer system. Non-limiting examples include files, folders, computing machines, memory, processors, servers, hard drives, databases, laptops, RSA tokens, client badges, etc.

Data Object or Object: A data container for information representing specific things that have a number of definable properties. For example, a data object can represent an entity such as a person, a place, an organization, a resource, a link, a qualification, or other noun. A data object can represent an event that happens at a point in time or for a duration. A data object can represent a document or other unstructured data source such as an e-mail message, a news report, or a written paper or article. Each data object may be associated with a unique identifier that uniquely identifies the data object. The object's attributes (e.g. metadata about the object) may be represented in one or more properties.

Object Type: A type of a data object (e.g., User, Resource, or Qualification). Object types may be defined by an ontology and may be modified or updated to include additional object types. An object definition (e.g., in an ontology) may include how the object is related to other objects, such as being a sub-object type of another object type (e.g. an agent may be a sub-object type of a person object type), and the properties the object type may have.

Charter: A set of one or more rules that govern a group of one or more resources and a group of one or more users that can access the resources. A charter is purpose-based or context-based, rather than role based. A charter has defined controls relating to the resources and/or the users. The controls are indicated by a group of markings, each marking having a defined purpose and/or corresponds to a control (e.g., a restriction) associated with the marking. A charter's markings are defined by an administrator. The markings of a charter can be changed by an administrator and the controls associated with the revised markings of the charter can be applied to a next user session.

Object Centric Data Model

To provide a framework for the following discussion of specific systems and methods described herein, an example access management system 110 using an ontology 105 will now be described. This description is provided for the purpose of providing an example and is not intended to limit the techniques to the example data model, the example database system, or the example database system's use of an ontology to represent information.

In some embodiments, a body of data is conceptually structured according to an object-centric data model represented by ontology 105. The conceptual data model is independent of any particular database used for durably storing one or more database(s) 109 based on the ontology 105. For example, each object of the conceptual data model may correspond to one or more rows in a relational database or an entry in Lightweight Directory Access Protocol (LDAP) database, or any combination of one or more databases.

FIG. 1 shows an object-centric conceptual data model according to an embodiment. An ontology 105, as noted above, may include stored information providing a data model for storage of data in the database 109. The ontology 105 may be defined by one or more object types, which may each be associated with one or more property types. At the highest level of description, data object 101 is a container for information representing things in the world. For example, data object 101 can represent an entity such as a person, a place, an organization, a resource, or other noun. Data object 101 can represent an event that happens at a point in time or for a duration. Data object 101 can represent a document or other unstructured data source such as an e-mail message, a news report, or a written paper or article. Each data object 101 is associated with a unique identifier that uniquely identifies the data object within the database system. In implementations of access management systems, computer resources, charters, controls, authorizations, qualifications, and users can all be implemented as data objects. The objects are each associated with various properties, and may be linked to one another. In some embodiments, the data object 101 can be a charter data object, a resource data object, a control data object, a qualification data object, or a qualification data object.

Different types of data objects may have different property types. For example, a "Person" data object might have an "Eye Color" property type and an "Event" data object might have a "Date" property type. Each property 103 as represented by data in the access management system 110 may have a property type defined by the ontology 105 used by the database 109.

Objects may be instantiated in the database 109 in accordance with the corresponding object definition for the particular object in the ontology 105. For example, a specific folder (e.g., an object of type "Resource") at "C:\Folder" (e.g., a property of type "directory") may be stored in the database 109 as an resource object with associated qualifications and use cases as defined within the ontology 105.

The data objects defined in the ontology 105 may support property multiplicity. In particular, a data object 101 may be allowed to have more than one property 103 of the same property type. For example, a "Person" data object might have multiple "Address" properties or multiple "Name" properties.

Each link 102 represents a connection between two data objects 101. In some embodiments, the connection can be through a relationship, an event, a property, or through matching properties. A relationship connection may be asymmetrical or symmetrical. For example, "Person" data object A may be connected to "Person" data object B by a "Boss Of" relationship (where "Person" data object B has an asymmetric "Boss Of" relationship to "Person" data object A), a "Kin Of" symmetric relationship to "Person" data object C, and an asymmetric "Member Of" relationship to "Organization" data object X. The type of relationship between two data objects may vary depending on the types of the data objects. For example, "Person" data object A may have an "Appears In" relationship with "Document" data object Y or have a "Participate In" relationship with "Event" data object E. As an example of an event connection, two "Person" data objects may be connected by an "Office" data object representing a particular business office if they worked at the same place, or by a "Meeting" data object representing a particular meeting if they both attended that meeting. In one embodiment, when two data objects are connected by an event, they are also connected by relationships, in which each data object has a specific relationship to the event, such as, for example, an "Appears In" relationship. In some examples relating to an access management system, a charter data object may be connected to one or more resource data objects representing the resources that are available for data processing operations under a charter. A charter data object may be linked to one or more control data objects representing controls (e.g., restrictions) that are imposed on the user while operating under the charter associated with the charter data object. A control data object may be linked to one or more qualification data objects representing one or more qualifications the user must achieve to access certain or all of the resources associated with a charter. A control object may be linked to one or more authorization data objects representing one or more authorizations the user must achieve to access a certain resource under the charter. A user data object may be linked to one or more charter data objects representing that the user associated with the user object has permissions sufficient to be provided an option of selecting a charter associated with the charter object.

As an example of a matching properties connection, two "Person" data objects representing accountants at a finance firm, may both have a "CPA Qualified" property that indicates that both of them have CPA licenses. If both people work at the same office, then their "Business Address" properties likely contain similar, if not identical property values. In some embodiments, a link between two data objects may be established based on similar or matching properties (e.g., property types and/or property values) of the data objects. For example, a link between a charter data object and a user data object may by established based on at least some similar markings. A link between a charter data object and a control data object may be established based on the control data object having a marking similar to a marking of the charter data object. These are just some examples of the types of connections that may be represented by a link, and other types of connections may be represented; embodiments are not limited to any particular types of connections between data objects. For example, a document might contain references to two different objects. For example, a document may contain a reference to an event (one object), and a person (a second object). A link between these two objects may represent a connection between these two entities through their co-occurrence within the same document.

Each data object 101 can have multiple links with another data object 101 to form a link set. Each link 102 as represented by data in a database may have a link type defined by the database ontology used by the database.

Figure 2:
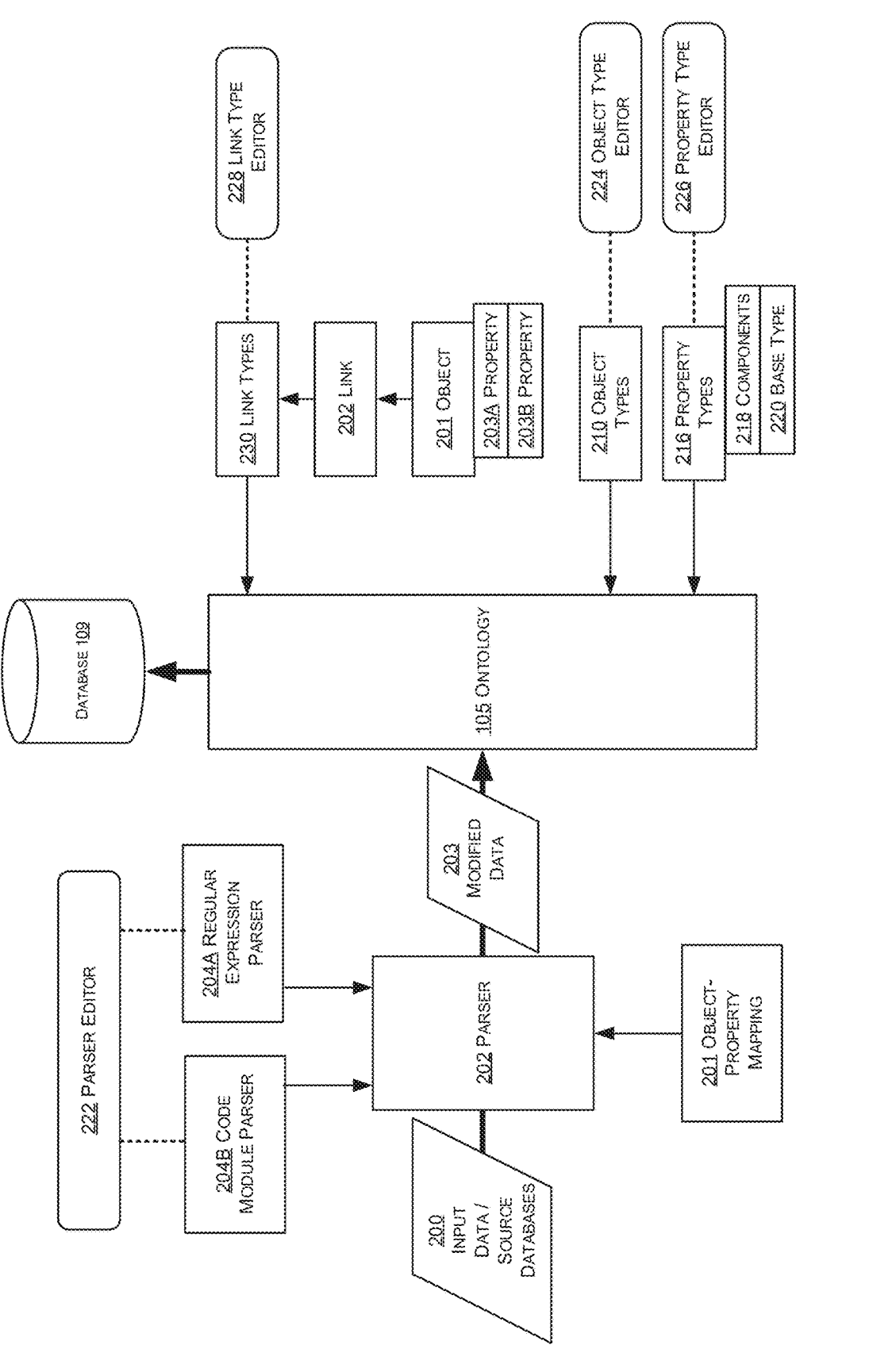
FIG. 2 shows a block diagram illustrating example components and data that may be used in identifying and storing data according to an ontology.

FIG. 2 shows a block diagram illustrating exemplary components and data that may be used in identifying and storing data according to an ontology. In this example, the ontology may be configured, and data in the data model populated, by a system of parsers and ontology configuration tools. In the embodiment of FIG. 2, input data 200 is provided to parser 202. The input data may comprise data from one or more sources. For example, a rental car institution may have one or more databases with information on calendar entries, rental cars, and people. The databases may contain a variety of related information and attributes about each type of data, such as a "date" for a calendar entries, an address for a person, and a date for when a rental car is rented. The parser 202 is able to read a variety of source input data types and determine which type of data it is reading.

In accordance with the discussion above, the example ontology 105 comprises stored information providing the data model of data stored in database 109, and the ontology is defined by one or more object types 210, one or more property types 216, and one or more link types 230. Based on information determined by the parser 202 or other mapping of source input information to object type, one or more data objects 101 may be instantiated in the database 109 based on respective determined object types 210, and each of the objects 101 has one or more properties 103 that are instantiated based on property types 216. Two data objects 101 may be connected by one or more links 102 that may be instantiated based on link types 230. The property types 216 each may comprise one or more data types 218, such as a string, number, etc. Property types 216 may be instantiated based on a base property type 220. For example, a base property type 220 may be "Locations" and a property type 216 may be "Home."

In some embodiments, an administrator of the system uses an object type editor 224 to create and/or modify the object types 210 and define attributes of the object types. In some embodiments, an administrator of the system uses a property type editor 226 to create and/or modify the property types 216 and define attributes of the property types. In some embodiments, an administrator of the system uses link type editor 228 to create the link types 230. Alternatively, other programs, processes, or programmatic controls may be used to create link types and property types and define attributes, and using editors is not required.

In some embodiments, creating a property type 216 using the property type editor 226 involves defining at least one parser definition using a parser editor 222. A parser definition comprises metadata that informs parser 202 how to parse input data 200 to determine whether values in the input data can be assigned to the property type 216 that is associated with the parser definition. In an embodiment, each parser definition may comprise a regular expression parser 204A or a code module parser 204B. In other embodiments, other kinds of parser definitions may be provided using scripts or other programmatic elements. Once defined, both a regular expression parser 204A and a code module parser 204B can provide input to parser 202 to control parsing of input data 200.

Using the data types defined in the ontology, input data 200 may be parsed by the parser 202 determine which object type 210 should receive data from a record created from the input data, and which property types 216 should be assigned to data from individual field values in the input data. Based on the object-property mapping 201, the parser 202 selects one of the parser definitions that is associated with a property type in the input data. The parser parses an input data field using the selected parser definition, resulting in creating new or modified data 203. The new or modified data 203 is added to the database 109 according to ontology 105 by storing values of the new or modified data in a property of the specified property type. As a result, input data 200 having varying format or syntax can be created in database 109. The ontology 105 may be modified at any time using object type editor 224, property type editor 226, and link type editor 228, or under program control without human use of an editor. Parser editor 222 enables creating multiple parser definitions that can successfully parse input data 200 having varying format or syntax and determine which property types should be used to transform input data 200 into new or modified input data 203.

Authentication

Figure 3:
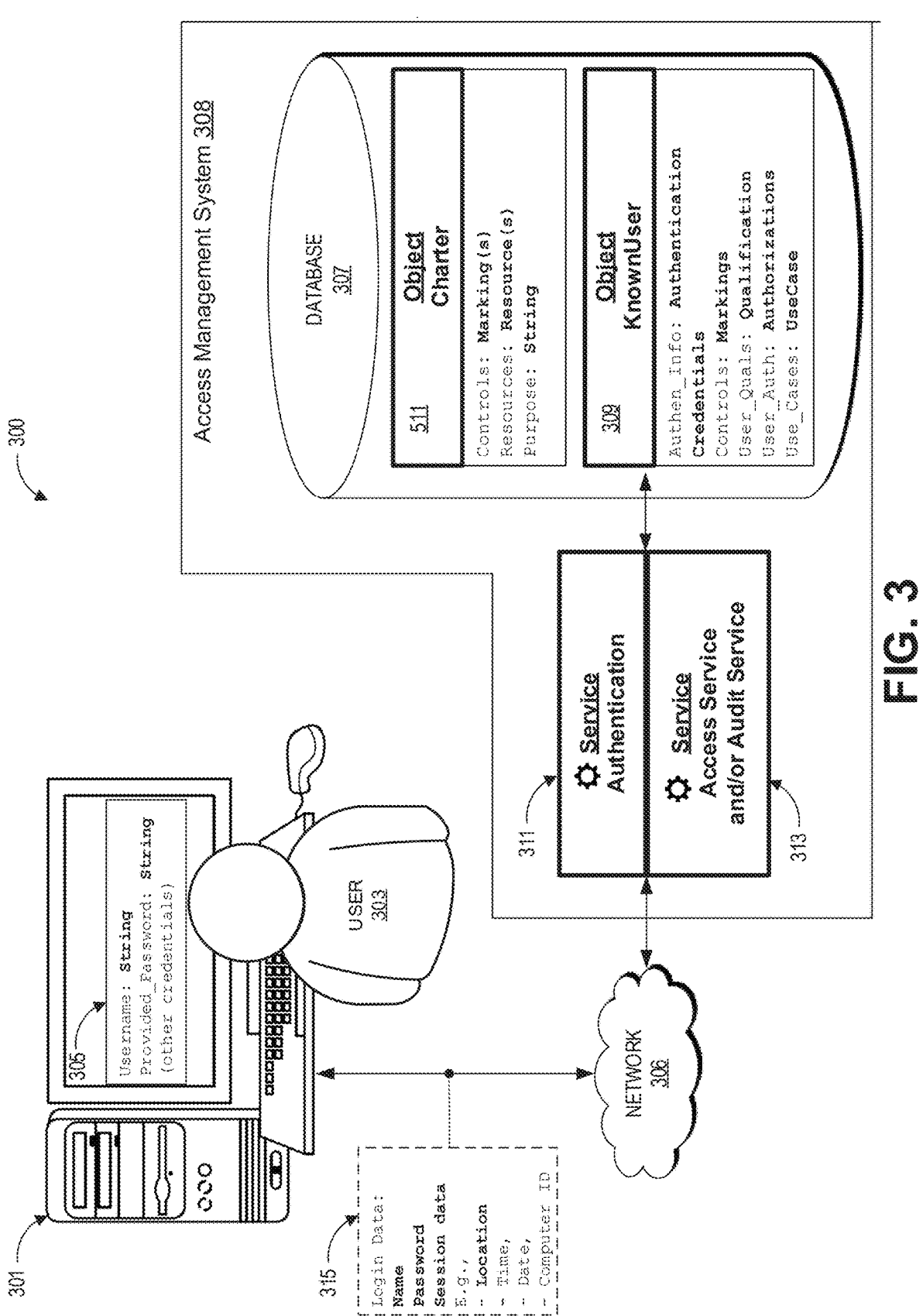
FIG. 3 shows an example block diagram including object models for authenticating a user.

FIG. 3 shows an example block diagram 300 including object models for authenticating a user to access computer resources for a data processing session. A user can be authenticated for a using authentication credentials, e.g., based on a username and password provided by the user. FIG. 3 shows a first computer system 301 being used by a user 303 to transmit authentication credentials 305 across a network 306. The access management system 308 receives the authentication credentials 305 and authenticates the authentication credentials 305 against a database 307 of known user objects 309.

Login data 315 can also be transmitted across a network 306. Login data 315 can include information relating to the computer 301 the user 303 is using to login for a session. For example, a location of the computer 301, an IP address, computer 301 identification information, a "local" time at the location of the first computer 301 being used to login, a "local" date at the location where the first computer 301 is being used to login, and the like. The access management system 308 receives the login data 315 and, after the access management system 308 authenticates the user 303, the access management system can compare login data 315 and/or data associated with the user 303 against a database 307 of charter objects and determines which charters to provide to the user 303 for selection for the session. The determination of which charters to provide to the user for selection can be based on comparing markings of the known user object 309 associated with the user 303 to markings of charter objects 511 (FIG. 5) associated with a charter, and may also be based on comparing aspects of the login data 315 to controls of the charter objects 511. Authentication of the user 303 is further described with respect to FIG. 3 and FIG. 4. Determining which charters to provide for selection by a user 303 is described with respect to FIGS. 5, 6, and 7.

The user 303 may use a variety of different types of computer systems 301 to access various resources. The computer system 301 can include a desktop, laptop, terminal, smartphone, smartTV, etc. The user 303 may desire to access a variety of resources, such as files, folders, computing machines, memory, processors, servers, hard drives, databases, laptops, RSA tokens, client badges, etc., including time or job slots for using any of the aforementioned resources. Access to the resources can be restricted and audited as discussed herein.

The authentication credentials 305 provided by a user can include a username and password. In various embodiments, the authentication credentials 305 can include additional information, such as answers to challenge questions, hardware identifiers, passwords or information received through a second communication channel (e.g., smart phone) via N-factor authentication, time-based authentication data, etc. The authentication credentials 305 can be transmitted through a network 306 to the access management system 308 to authenticate the user 303.

The access management system 308 can use an authentication service 311 to compare the authentication credentials 305 against the authentication credentials of known user objects 309 in a database 307 and/or another database. An example flowchart for the authentication service 311 is discussed with respect to FIG. 4.

The access management system 308 can use an access and/or audit system to manage user access to various computer resources. Example flowcharts for access and/or audit services are described with respect to FIG. 6.

Figure 5:
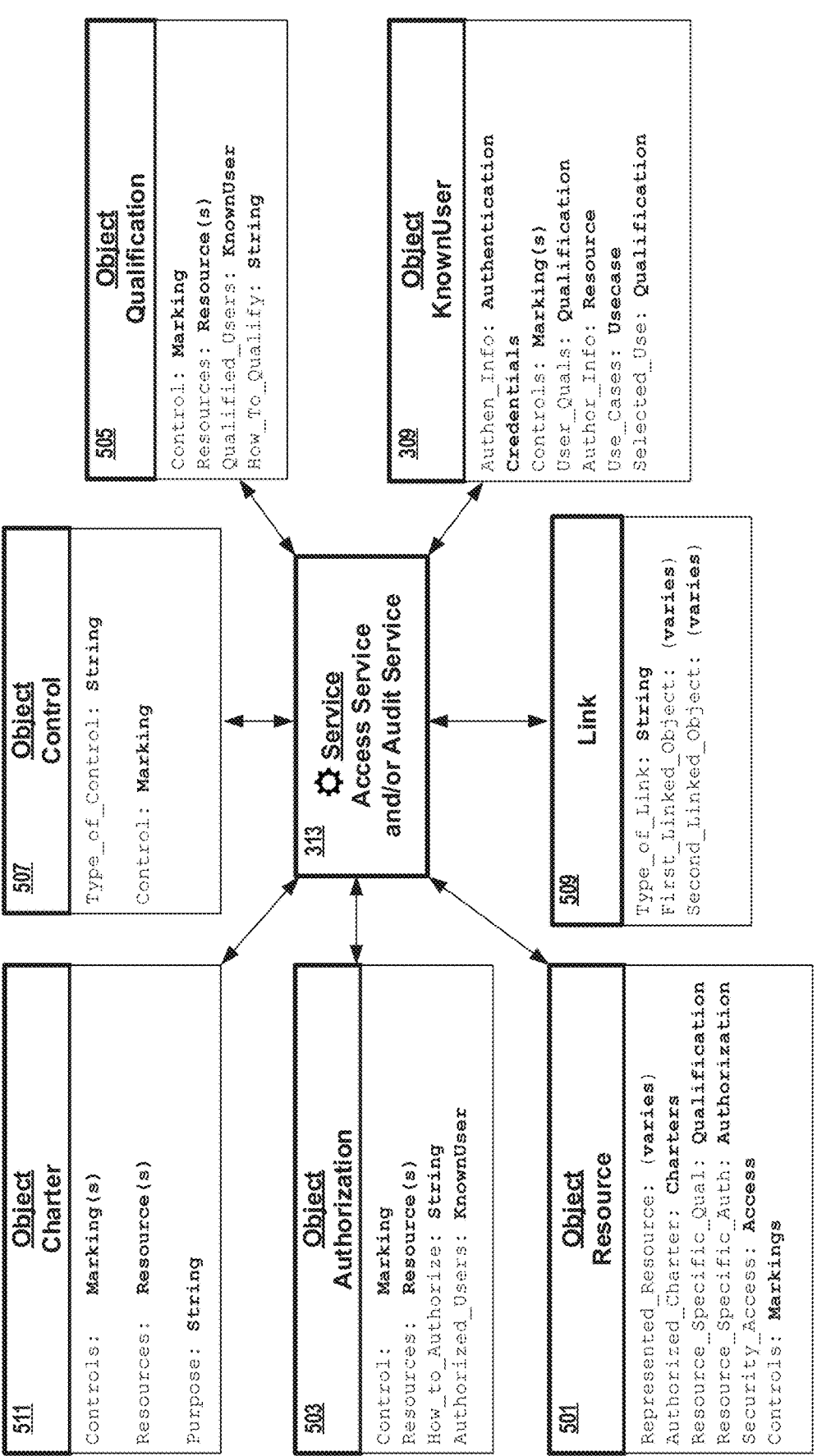
FIG. 5 shows an example block diagram including object models for managing access to resources using charters, qualifications, and authorizations.
Figure 8:
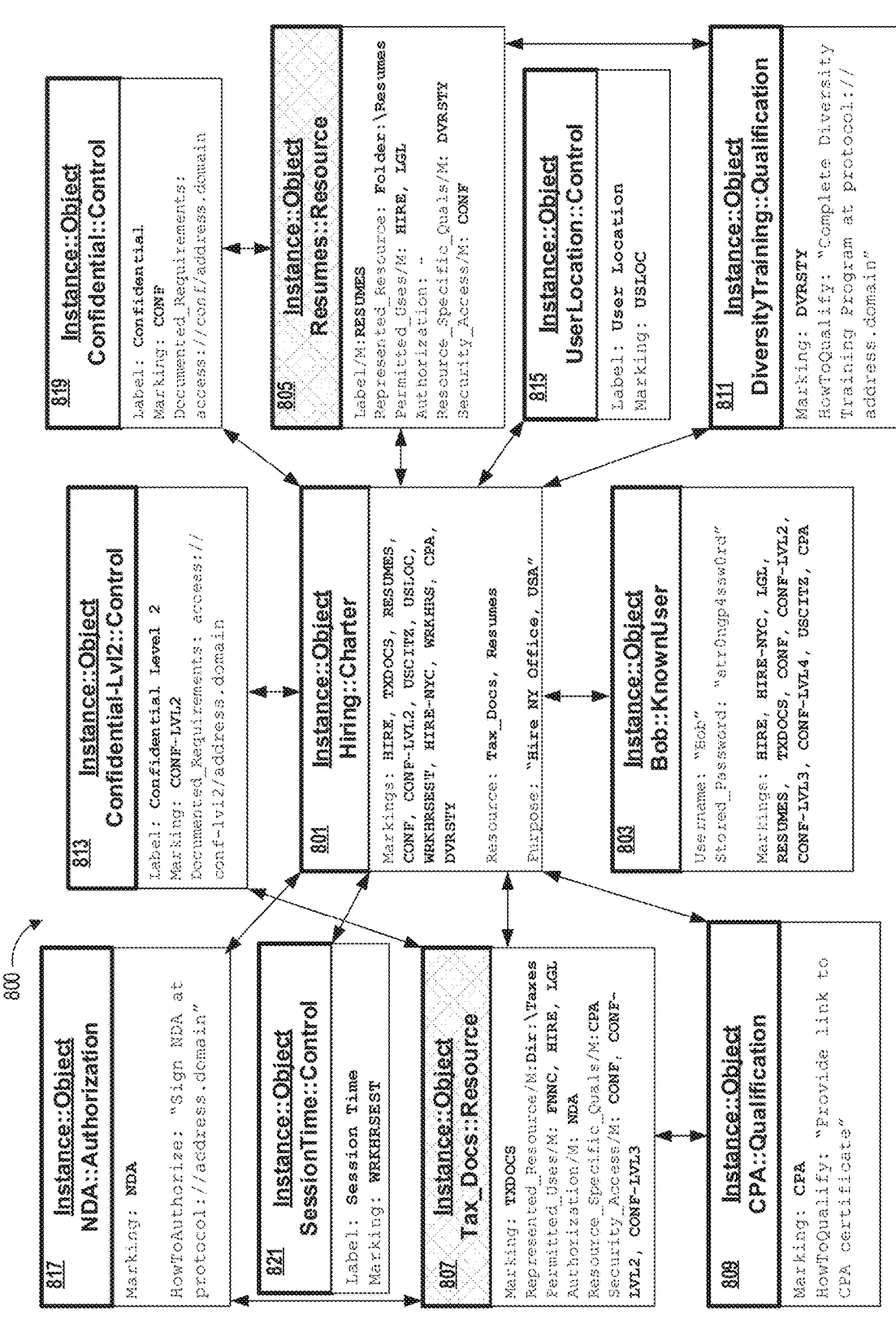
FIG. 8 shows example models for instances of objects related to an instance of a known user object.

The database 307 can include a plurality of known user objects 309 representing known users, and a plurality of charter objects 511 representing defined charters. The database 307 can additionally include a plurality of other objects, such as shown in FIG. 5 and FIG. 8.

The charter object 511 is represented with an object model. The charter object 511 has a plurality of properties. The charter object 511 can include a property such as "Controls" which can be markings that control data processing under the charter. The markings can include, for example, characters, numbers, and/or symbols to indicate a particular control. In various embodiments, controls can relate to who can work under the charter and access the charter resource, the purpose of data processing under the charter, authorizations and qualifications needed to work under the charter, and/or session specific controls. For example, the location of the user 303 (e.g., country, state, city, building, IP address, etc.), the computer 301 being used by the user 303 to communicate with the access management system 308, the time of the session, (e.g., user's local time or time at the access management system 308, the date of the session (e.g., user's local date or the date at the access management system 308), and the like.

The known user object 309 is represented with an object model. The known user object 309 has a plurality of properties. The known user object 309 can include a property such as "Authen_Info" to indicate information used for authentication credentials. The authentication credentials can include a username, an encrypted password, encryption scheme, etc. The authentication credentials can include string values, other object types, and/or references to other resources such as an encrypted database.

The known user object 309 can also include properties such as "Controls" to indicate markings that are associated with the known user. In some embodiments, the markings indicate permissions granted to the known user. For example, the permissions may indicate access to certain types of data/information, access to data originating from certain sources, access to certain types of resources, security access levels of the known user, data processing rights, etc. The known user object 309 can also include properties such as "User-Quals" which can indicate a link to a qualification objects that indicate qualifications of the known user. "User_Auth" can indicate a link to an authorization object that indicates authorizations of the known user. "Use_Cases" can indicate a link to use cases, purposes the known user is allowed to access resources for. A known user object 309 may include other properties, or different properties, in different embodiments. Known user object 309 is further described with respect to FIGS. 5, 6 and 7. Although the object model includes example types/objects associated with each property, it will be understood that various embodiments can use different data types and/or types of objects for the properties. For example, the Authen_Info can be an object indicating authentication credentials, a String, a double, etc. As further explained with respect to FIG. 5, any of the properties of the known user object 309 can additionally or alternatively be indicated using links 509.

Figure 4:
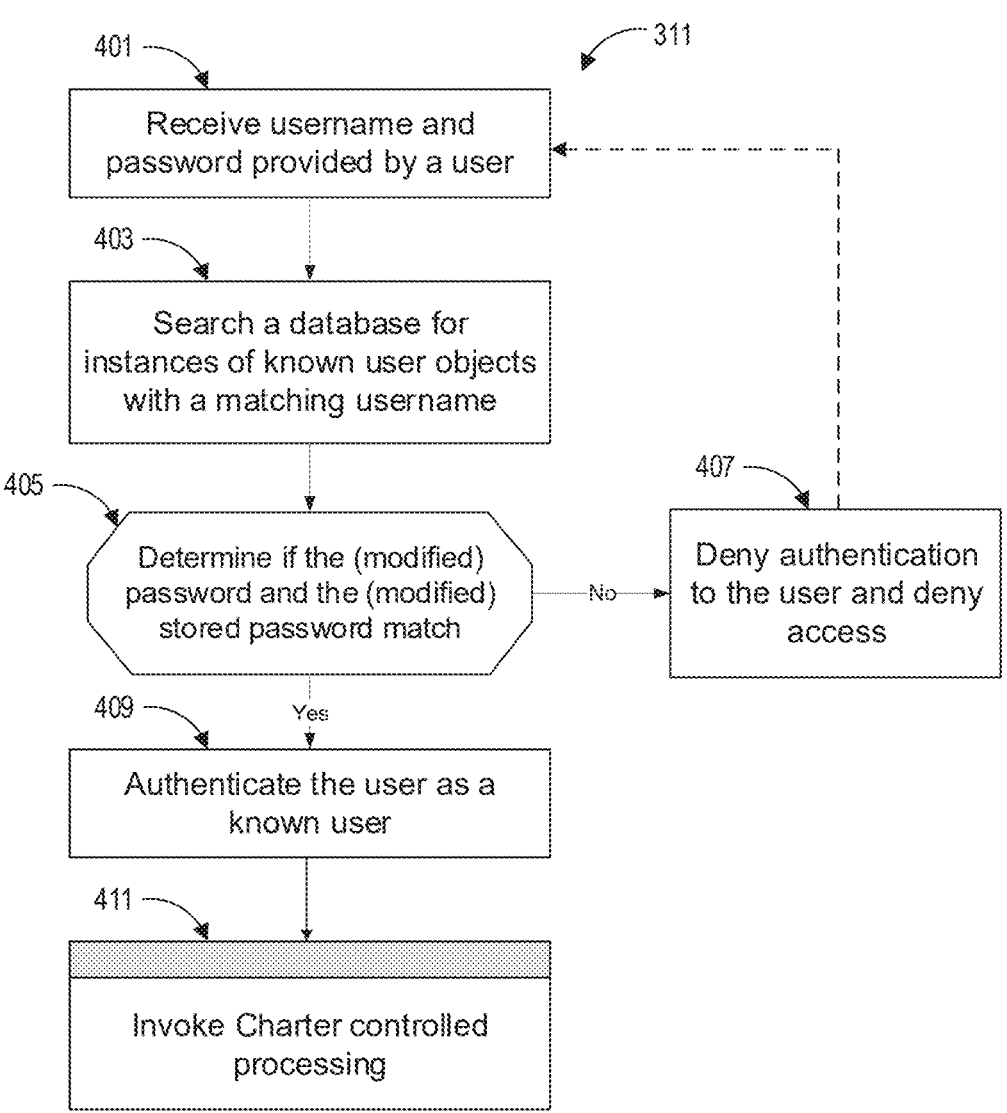
FIG. 4 shows a block diagram for an example authentication service.

FIG. 4 shows a block diagram for an example authentication service 311. At block 401, a username and password provided by a user can be received. In some embodiments, other authentication credentials can be received as well.

At block 403, a database (such as database 307 of FIG. 3) can be searched for instances of known user objects that match the username provided by the user. In some embodiments, the search can be performed by referencing an index. A matching known user object can be found. In some embodiments, the searching for a matching user can be performed at the operating system level with or without the use of objects.

At block 405, it can be determined if the password provided by the user and the stored password for the matching known user match. If at block 405, the password provided by the user and the stored password of the known user does not match, then at block 407, the user is denied authentication and denied access. If at block 405, the password provided by the user and the stored password of the known user do match, at block 409, the user can be authenticated as a known user. At block 411, an access service 313 can invoke charter controlled processing to determine which charters should be provided to the user 303 for selection. Providing access to charter associated resources, and control of such access, can be performed as described with respect to FIGS. 5-8.

Charters, Markings, Authorization, and Qualifications

After authenticating the identity of the user, an access management system can determine which resources the user is authorized to access. For example, the user may have authorizations to read, write, and/or modify different resources. In addition to managing the authorizations, the access management system can provide to the user a selection of one or more charters for the user to select, under which the data processing for that session will be conducted. The selected charter case can be selected from among a plurality of available charters that have certain associated markings that the user also has. The markings associated with the charter, that control the users access to the certain charter, can be a subset of the total markings that are associated with the user. Even though the markings associated with the user may permit a higher level of access than is needed to work under a certain charter, when the user is working under particular charter, the user's accesses to data, excesses to resources, permissions, qualifications, restrictions/constraints, authorizations, etc. are limited by the controls of the particular charter to those accesses to data, excesses to resources, permissions, qualifications, restrictions/constraints, and authorizations defined for the charter, and no more. By comparing the markings associated with the user in the markings associated with a charter, it can be determined which charters the user is allowed to select for performing data processing, and only these charters are presented to the user for selection.

In addition to providing controls to a user's data processing under a charter, the access management system can determine if a user has sufficient qualifications work under the charter. The access management system can also determine if a user needs to execute a certain agreement (or authorization) to work under the charter. The qualifications required to work under a charter may be determined by the qualifications that are required to access one or more resources associated with the charter. Similarly, the authorizations required to work under a charter may be determined by the authorizations that are required to access one or more resources associated with the charter. Such qualification and authorization requirements can be specified per-resource, per session, and/or within a period of time since the user last completed the qualification and/or the authorization. The known user object 309 can store information relating to the user's qualifications and/or authorizations including information relating to when the qualifications and/or authorizations were last completed.

FIG. 5 shows an example block diagram 500 including object models for managing access to resources using charters, including managing access using qualifications and authorizations that are associated with the resources or the charters. The block diagram 500 includes examples of an object model for a known user 309, an object model for a resource 501, an object model for an authorization 503, an object model for a qualification 505, an object model for a control 507, an object model for a link 509, an object model for a charter 511 and one or more services 313 for managing access to resources and/or auditing access to resources. Various embodiments can include more object models, fewer object models, and/or different object models. The objects can be stored in a database, such as the database 307 described with respect to FIG. 3, and the services 313 can be executed by a system such as the access management system 308 described with respect to FIG. 3.

In FIG. 5, the known user object 309 can represent a user who may access various resources. The known user object 309 can include a plurality of properties. An access service may use one or more of the properties to control the user's access to resources and the data processing the user may perform. The properties illustrated in FIG. 5 are examples of certain properties that a known user object 309 can have. Different embodiments of access services may use different properties to determine the access of the user. Accordingly, in various embodiments of access control, the known user object 309 may have one or more of the illustrated properties, and/or one or more additional properties.

The properties of the known user object 309 can include authentication information such as "Authen_Info." The authentication information can include a username, a stored or encrypted password, and/or other information used for authenticating credentials. The known user object 309 can also include a property such as "Author_Info" to indicate linked resource objects 501 that the known user has access to. For example, the authentication information can indicate linked resource objects 501 that represent resources that the known user is authorized to read from, write to, modify, or otherwise access. In some embodiments, an operating system, file management system, and/or other service (such as an access control list ("ACL") service) can manage authentication and authorizations, and the properties or links of the known user object 309 do not necessarily include authentication information or authorization information. An access service can, in some instances, can use less than all of the properties of a user to provide access to resources for certain data processing.

In an embodiment of another access service that controls access to resources based on charters and an associated charter object 511. In some such embodiments, and the associated charter object 511, the Use_Cases property is not used, and is not included in the known user object 309. In other embodiments, for an access service that controls access to resources based on charters and an associated charter object 511, such an access system may include the Use_Cases property, or a marking that is indicative of a use case, to provide additional control of accessing resources under the charter. The description herein generally relates to charter-based access systems that control access to resources based on charters and an associated charter object, as described below and in FIGS. 6, 7, 8 and 9.

The resource object 501 includes a property such as "Represented_Resource" specifying a computer resource being represented by the resource object 501. The represented resource can be, for example, a String data type that indicates a file, folder, directory, dataset, application, code repository, analysis, a hardware identifier, a name of a computer, a link, a uniform resource locator (URL), a server, a printer, etc. The represented resource can also be, for example, another class of object that specifies a particular computer resource. The resource object 501 can also include a property such as "Authorized_Charter" indicating linked known charter objects 511 that represent charters that have authorizations for the represented resource. The resource object 501 can also have a property such as "Resource_Specific_Quals" indicating linked qualification objects to represent qualifications to be satisfied in order to access the represented resource. In some embodiments, the resource object 501 may indicate a plurality of qualifications, any one of which may be satisfied to grant access. The resource object 501 may additionally or alternatively include a plurality of qualifications, all of which are to be satisfied for access. The resource object 501 can also have a property such as "Resource_Specific_Auth" indicating linked authorization objects to represent authorizations to be satisfied in order to access the represented resource. In some embodiments, the resource object 501 may indicate a plurality of authorizations, any one of which may be satisfied to grant access. The resource object 501 can also have a property such as "Security_Access" indicating linked access objects to be satisfied in order to access the represented resource. The resource object 501 can also have a property such as "Controls" indicating one or more markings specifying additional controls for accessing the represented resource.

The authorization object 503 can be used to represent a type of authorization that is required for resource access and/or an authorization that a known user has obtained. The authorization object 503 can have a property such as "Controls" for markings indicating the type of authorization represented by the authorization object 503 Example types of authorizations include signing or acknowledging an agreement related to accessing confidential material of a certain level, an agreement relating to privacy issues, an agreement related to nondisclosure, an agreement related to non-use for purposes other than data processing under the charter, an agreement relating to compliance, an agreement related to being subject to additional monitoring or scrutiny, an agreement related to copying data, an agreement relating to geographic access of a resource, etc. An authorization object 503 can have a property such as "Authorized_Users" indicating linked known user objects 309 that have obtained the type of qualification represented by the qualification object 505. An authorization object 503 that is linked to a charter object 511 or a resource object 501 can indicate an authorization that is required for the purpose or for accessing the represented resource, respectively. The authorization object 503 can have a property such as "How_To_Authorize" to provide instructions to users about how to obtain the authorization. The indication of how to obtain the authorization can be presented to users who are trying to access a resource that requires the type of authorization if the users have not obtained the type of authorization. For example, the indication of how to obtain the authorization can be a string, such as a prompt to "Complete a confidentiality agreement for resource x." As other examples, the indication of how to obtain the authorization can be a different object, such as an object representing a web page or URL that a user should access, an object representing a different user to be contacted, etc.

The qualification object 505 can be used to represent a type of qualification that is required for resource access and/or a qualification that a known user has obtained. The qualification object 505 can have a property such as "Controls" for indicating the type of qualification represented by the qualification object 505. Example types of qualifications include completing trainings, technical skills, title, licenses, approval from another user such as a data owner compliance owner to access data, etc. The qualification object 505 can have a property such as "Qualified_Users" indicating linked known user objects 309 that have obtained the type of qualification represented by the qualification object 505. A qualification object 505 that is linked to a charter object 511 or a resource object 501 can indicate a qualification that is required for the charter or for accessing the represented resource, respectively. The qualification object 505 can have a property such as "How_To_Qualify" to provide instructions to users about how to obtain the qualification. The indication of how to obtain the qualification can be presented to users who are trying to access a resource that requires the type of qualification if the users have not obtained the type of qualification. For example, the indication of how to obtain the qualification can be a string, such as a prompt to "Complete a training program at this website" or "provide your qualification course number." As other examples, the indication of how to obtain the qualification can be a different object, such as an object representing a web page or URL that a user should access, an object representing a different user to be contacted, etc.

The control object 507 can be used to link charters and controls imposed on users working under the charter. The control object 507 can have a property such as "Type_of_Control" to describe a purpose or type of the control. The control object 507 can also be linked to one or more qualification objects 505 and authorization objects 503 (e.g., by a marking) and to one or more charter objects to indicate a required control to work under the charter and/or to access a resource under the charter. When the control object 507 is linked to a resource object 501 and a charter object 511, the charter object 511 can treat the control object 507 as a control that is required for accessing the represented resource under the charter. When the control object 507 is linked to a resource object 501, the resource object 501 can also treat the required qualifications of the control object 507 as qualifications that are required for accessing the represented resource.

The charter object 511 can be used to indicate sets of rules (e.g., permissions and constraints) that govern a group of resources to be accessed by a group of users. The charter object 511 can also indicate allowed purposes for accessing resources and/or a purpose that a user has specified for accessing resources. A charter object 511 can include a group of one or more marking that indicate controls that are in place for users working under the charter associated with the charter object 511. Controls and corresponding markings can be related to authorizations, qualifications, users, and resources. Controls and corresponding markings can be related to controls imposed on the particular session. Controls may prohibit that the same known user logged into a session to work under a charter, but then not allow the same known user to work under the same charter in a different session. For example, restricting access to work under a charter may be the result of a control related to the geographic location of the user, the computer the user is using to access the charter to work under the charter, the date or time the user is accessing the charter, the frequency of access to the charter, the number of people accessing the charter, the time since last access to the charter, etc. Charter objects 511 can include a property such as "Resources" indicating linked resource objects 501 to the charter object 511. A resource may have a plurality of types of data, and each may require a different access control. A known user may have various level of access permissions to allow the known user to see multiple types of different data. Even though such a resource may be associated with a charter (e.g., via a link connecting the charter object 511 and the resource object 501) and a known user having multiple access permissions, the controls (and corresponding markings) of the charter may limit the user to access only certain data. Thus, the charter may limit access to data in a resource to only the data as defined in the charter, even though the users has greater access permissions.

In various embodiments, the links between objects can be achieved in different ways. As one example, FIG. 5 shows a symmetrical link between charter objects 511 and resource objects 501 in that each charter object 511 can indicate linked resource objects 501 (e.g., via the Resources properties of the charter object 511) and in that each resource object 501 can indicate linked charter objects 511 who have the respective markings (e.g., via the Authorized_Charter properties of the resource object 501. As another example, FIG. 5 shows a one directional link between a charter object 511 and a control object 507 via the Controls property of the charter object 511 (e.g., a marking under the Controls property of the Charter Object 511 is the same marking as the marking under the Control property of the control object 507). Similarly, the charter object 511 may have a one-directional link to one or more qualification objects 505 via a control property (e.g., a marking), and/or the charter object 511 may be linked to one or more authorization objects 503 via a control property (e.g., a marking). Symmetrical links provide redundant information but may sometimes facilitate searching. In various embodiments, any combination of the links shown in FIG. 5 could be implemented as asymmetrical or symmetrical links.

In some embodiments, the links implemented through properties of objects can be additionally or alternatively be implemented using a link 509. The link 509 can include a description about the type of link (e.g., the "Type_of_Link") being represented or established by the link 509. The link 509 can include a first linked object and a second linked object that are linked to each other. The first and second linked objects can include known user objects 309, resource objects 501, authorization objects 503, qualification objects 505, control objects 507, and charter objects 511. The link 509 can be established based at least in part on a group of markings in the Control properties of the charter object 511. In one example, a link 509 can have a type of link that represents "Read authorized resources for a user under a charter" the first linked object can be one linked user object 309, and the second linked object can include one or more resource objects 501 that are linked to the charter for read access. Other example types of links can indicate that:

a known user object 309 "has a qualification of" a qualification object 505;

a resource object 501 or a charter object 511 "requires the qualification of" a qualification object 505;

a resource object 501 or a charter object 511 "requires the authorization of an authorization object 503;

a charter object 511 is "selected by" a known user object 309;

a known user object "has a [read/write/modify/any/all] authorization for" a resource object 501 under a charter associated with charter object 511;

a resource object 501 "may be accessed for purposes specified by" a charter object 511;

a resource object 501 "may be accessed by a user in a domestic location" under a charter object 511;

a resource object 501 "may be accessed by a user having qualifications" specified by a qualification object 505 under a charter object 511;

a resource object 501 "may be accessed by a user having an authorization" specified by an authorization object 503 under a charter object 511;

a resource object 501 "requires additional access controls" for work under a charter as specified by a control object 507 that is linked to a charter object 511 associated with the charter;

any other linked property or relationship discussed herein, including symmetric or asymmetric versions thereof.

Accordingly, in various embodiments, one, some, or all objects discussed herein can be linked by a link 509 instead of (or in addition to) having properties that specify linked objects. In various embodiments, one, some, or all objects discussed herein can be linked by a link 509 instead of (or in addition to) being linked through matching properties. In some embodiments, the link 509 can include additional (e.g., third, fourth, . . . , Nth) linked objects and indicate more complex multi-object relationships.

The service 313 can include an access service and/or an audit service. A computer system (such as the access management system 308 described with respect to FIG. 3) can use an access service to manage access by known users to represented resources. The access management system can also use an audit service to log the resource access (including access attempts) on a data storage device. The log can include times of access, an identity of the user attempting to access a resource, the resource being accessed, the use case for the access, and/or the qualifications for the user. An example flowchart for the access and audit services is discussed with respect to FIG. 6.

It will be understood that various embodiments can implement the objects in different ways. For example, the "Controls" of the charter object 511 is shown as one or more markings, but in some embodiments, the "Controls" can be an array, list, or other data structure indicating one or more control objects 507. The object models and the properties associated with the objects disclosed herein are not intended to depict necessary or an exhaustive list of properties.

Figure 6:
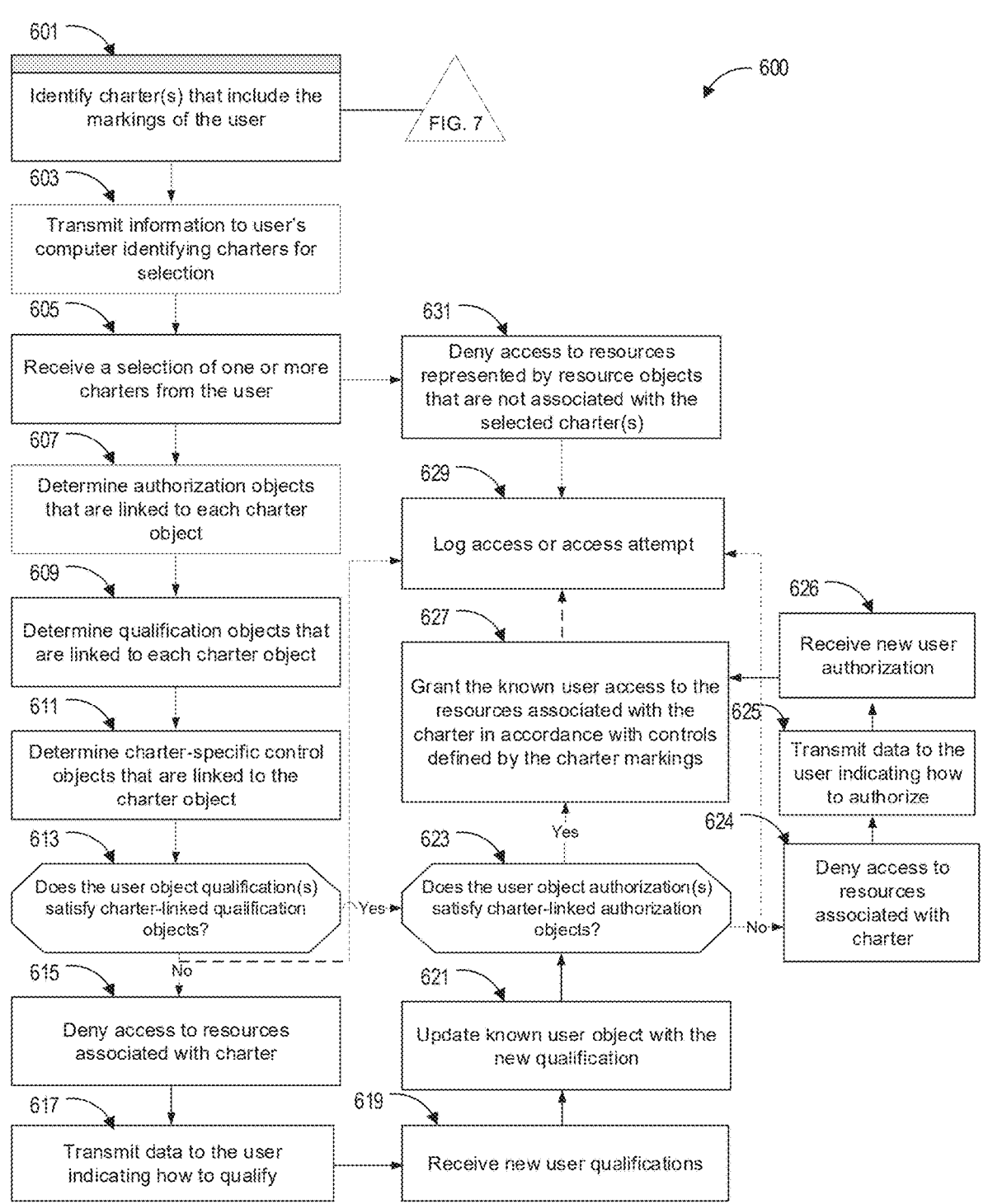
FIG. 6 shows a flowchart for an example access and audit service.

FIG. 6 shows a flowchart 600 for an example access and audit service. After a user is authenticated as a known user (such as described with respect to FIG. 4), access to resources can be managed and logged according to the flowchart 600. In some embodiments, an operating system, file management system, and/or other service can manage authentication and authorizations, and blocks relating to authentication and authorization can be skipped. FIG. 6 includes block 601 that are the same and/or similar to blocks 701, 703, 705, and 707 of flowchart 700 in FIG. 7.

Blocks 601-605, 611, 629 and blocks 701-707 relate to determining resource access resource access based at least in part on charters that have been predetermined (or defined) to provide a set of controls for allowing one or more users to access one or more computer resources. In some implementations, a separate property relating to a qualification, and/or a separate property relating to an authorization is used to indicate qualifications and/or authorizations needed to work under a charter and access resources linked to the charter. In some implementations, controls (e.g., markings) associated with the charter indicate, among other things, user qualifications and/or user authorizations needed to work under a charter and access resources linked to the charter. Using such controls may simplify the management of controlling access to resources under a charter because any qualification and authorization information is indicated at the charter object without having to determine such qualifications and authorizations by understanding relevant linked qualification and authorization parameters. In either implementation, an access and audit service can determine if a user has a required qualification or authorization using a required control or property that indicates the qualification or authorization is needed. Blocks 607 and 623-627 relate to determining resource access based at least in part on an authorization. Blocks 609 and 613-621 relate to determining resource access based at least in part on qualifications. To provide examples, the detailed description of FIG. 6 may refer to portions shown in and discussed with respect to FIG. 5. In some embodiments, an operating system, file management system, and/or other service can manage authentication and authorizations, and blocks relating to authentication and authorization can be skipped.

At block 601, charters that are available to an authenticated known user can be identified. For example, for a known user object 309, charters that have control property "markings" that are at least a subset of the markings associated with the known user object 309 can be identified. As another example, charters that have control property "markings" that are at least a subset of the markings associated with the known user object 309 and markings associated with the session (e.g., login data) can be identified. As another example, a plurality of links 509 that include links between a charter object and a known user object indicating they have an identical marking can be examined to identify which of the charter objects have at least a subset of the markings of the known user object. The flowchart 700 in FIG. 7 further describes identifying one or more charters that can be provided to a user for selection.

At block 603, data can be transmitted (such as to the computer system 301 shown in FIG. 3) to present, for the user to select, one or more charters, the user having all of the markings required by the charter. In some embodiments, the charters can be presented by displaying a title or a description of the respective charters.

At block 605, a selected charter can be received from the user. In some embodiments, a selection of multiple charters can be received from a user. In response to the selection, at block 631, the user is denied access to any resources that are not associated with the selected charter. Block 605 can also proceed to block 607.

At block 607, authorizations that the known user needs to work under the charter can be determined. This can be performed, for example, by determining which markings of the charter object are linked to authorization objects 503. In another example, authorizations that the known user has, and if they are sufficiently current, may be determined by authorizations indicated in the known user object 309. Block 607 can proceed to block 623.

At block 609, qualifications that the known user needs to work under the charter can be determined. This can be performed, for example, by determining which markings of the charter object are linked to qualification objects 505. In another example, qualifications that the known user has, and if they are sufficiently current, may be determined by qualifications indicated in the known user object 309. The qualification objects 505 that are required for a user for working under the charter may be collectively referred to as user qualification objects. Block 609 can proceed to block 611.

At block 611, charter specific control objects that are linked to the charter object can be determined and employed for the current session of the known user working under the charter. Charter controls can be used in various ways to control access to a resource by the known user. For example, one or more controls of the charter can be related to user login data, and if these controls are not satisfied for certain charters, those charters are not provided to the user as a choice of charters to select. In an example, if a control dictates the user be at a domestic location and the login session originates in Canada, the charter associated with that control will not be provided as a selection. Other charter controls can require a qualification or authorization by the user, as discussed above. Other charter controls can control aspects of the data processing performed under the charter. In an example, a control can limit the information accessible from a resource to only a certain level (e.g., confidential) when the resource has multiple levels of classified information. In another example, a control can prohibit combining data from two resources. In another example, a control relate to a time constraint (e.g., limiting a time of day for accessing a resource, limiting a duration of time that a resource can be accessed, etc.) Block 611 can be performed by determining which control objects 507 are linked to a charter object 511 and employing the control associated with the control object 507 in the session. Block 611 can proceed to block 613.

At block 613, it can be determined if qualifications of the known user satisfy or match the charter-specific qualifications. This can be performed, for example, by comparing qualification objects linked to the charter object to the user qualification objects. The comparison can be performed, for example, as an object to object comparison or by comparing properties of the qualification objects (e.g., the "Control" marking of the qualification object). In some embodiments, the charter-specific qualifications are satisfied if a user has at least one qualification that matches a charter-specific qualification. In some embodiments, the case-specific qualifications can be satisfied if a user has all of the charter-specific qualifications. If the user qualification objects do satisfy or match the charter-specific qualification objects, then block 613 can proceed to block 623. If the user qualification objects do not satisfy or match the charter-specific qualification objects, this can indicate that the user does not have the qualifications to access the represented resource for the selected purpose, and block 613 can proceed to block 615, where access to resource objects linked to the charter are denied. Block 615 can proceed to blocks 617, 619, and 621 to provide the known user to satisfy the qualification required by the charter.

At block 617, data indicating how the user can satisfy the qualification requirement can be transmitted to the user. This can be performed, for example, by determining the qualification objects 505 that are linked to the charter object(s) 511 that stipulate qualifications that the known user does not have, for example, as indicated by the known user object 309. The qualification objects 505 can include information on how to qualify, and such information can be provided to the user to complete the qualification. After a user has completed the qualification, at block 619, a new qualification for the known user is received. At block 621, the known user object can be updated to indicate the new qualification. Block 621 can proceed to block 623.

At block 623, it can be determined if authorizations of the known user satisfy or match the charter-specific authorizations. This can be performed, for example, by comparing authorization objects linked to the charter object to information in the known user object and/or authorization objects linked to the known user object. The comparison can be performed, for example, as an object to object comparison or by comparing properties of the authorization objects (e.g., the "Control" marking of the authorization object). If the user's authorizations satisfy or match the charter-specific authorizations, then block 623 can proceed to block 627. If the user authorization objects do not satisfy or match the charter-specific authorizations, block 623 can proceed to blocks 624, 625 and 626, where access to resource objects that are linked to the charter are denied, and information can be provided to the known user to satisfy the authorizations required by the charter.

At block 624, access to the resources associated with the charter can be denied, or access to the resources associated with the charter can be delayed. Access can be denied if the user authorization objects do not satisfy or match the charter-specific authorizations and the issue cannot be cured (e.g., by training, signing an agreement, acknowledging a restriction, etc.). If the issue may be cured, than access can be temporarily denied (i.e., access can be delayed) until the issue is cured. At block 625, data indicating how the user can satisfy the authorization requirement can be transmitted to the user. This can be performed, for example, by determining the authorization objects 503 that are linked to the charter object(s) 511 that stipulate authorizations that the known user does not have, for example, as indicated by the known user object 309. The authorization objects 503 can include information on how to complete the authorization, and at block 625 such information can be provided to the user to complete the authorization. After a user has completed the authorization, at block 626, a new authorization for the known user is received, and the known user object can be updated to indicate the new authorization. Block 626 can proceed to block 627.

At block 627, the user can be granted access to the resource that is associated with the charter in accordance with controls defined by the charter markings. Block 627 can proceed to block 629.

At block 629, accesses (including failed access attempts) can be logged for auditing. Block 629 can proceed after block 613, block 623, block 605, and block 627. The logged information can include, for example, one, all, or any combination of: a time of access, whether or not the access was successful, an identity of the user such as the username, the resource being accessed, the selected use case for the access (which can be indicated by the purpose of a use case), the qualifications for the user, the authorizations of the user, an outcome of block 613, an outcome of block 623, the required qualifications for accessing the resource, any reasons why access was denied, and other information.

In various embodiments, the blocks shown in FIG. 6 can be performed in a different order and/or with additional prompts to the user.

Figure 7:
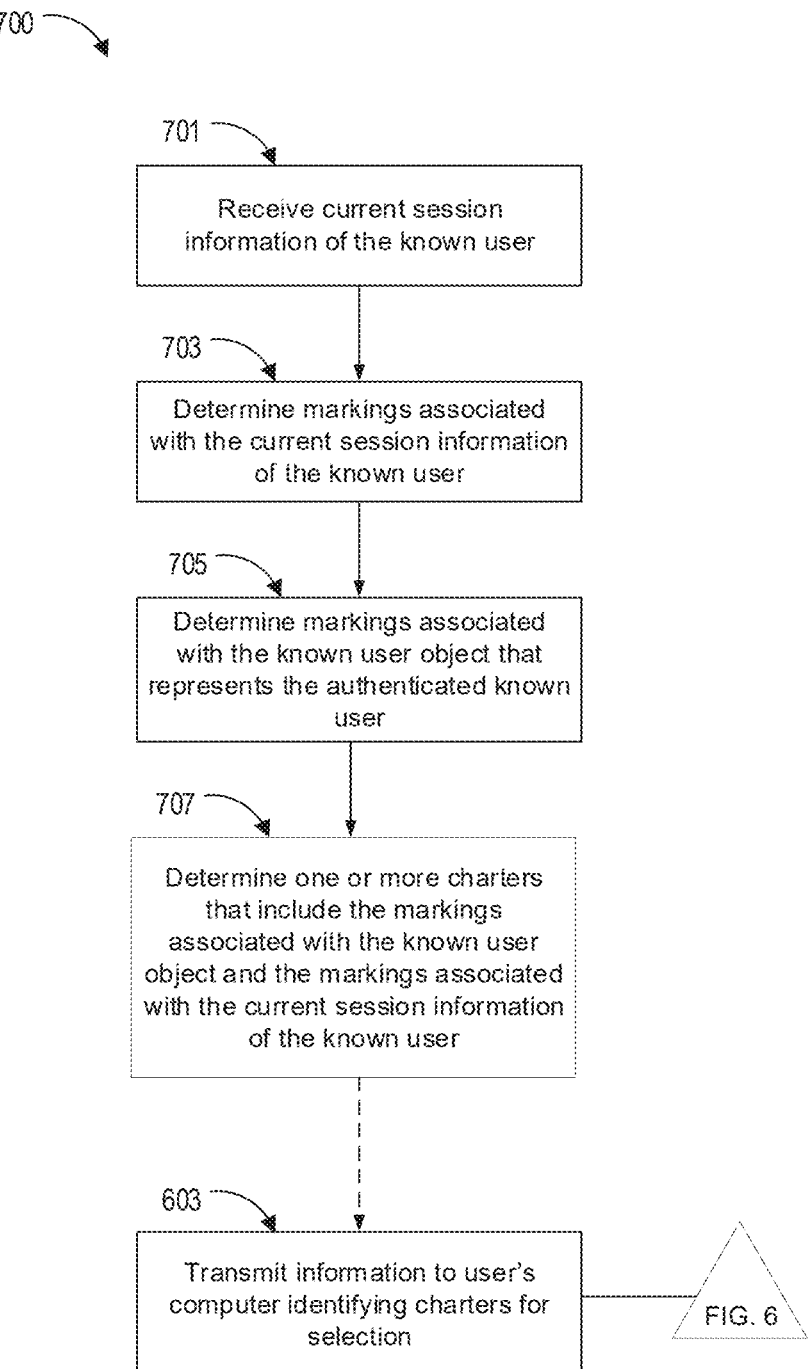
FIG. 7 shows a flowchart for providing a selection of charters to a user.

FIG. 7 shows a flowchart 700 for providing a selection of charters to a user that can be performed by an access service after a user has been authenticated as a known user (such as described with respect to FIG. 4). As described above, work under a charter governed by a set of rules. Each charter includes "Control" properties, each control property indicated by markings (e.g., letters, numbers, and/or symbols) indicating the control. The controls govern a user's access to resources associated with the charter. There can be several different types of controls associates with a charter. Some controls associated with a charter (which can be generally referred to as "gateway controls") can require certain session parameters and/or a user associated control marking. If controls associated with the user and the session does not meet charter rules indicated by such gateway controls, the user cannot work under the charter. In such cases, the user is not provided such charters to select when a selection of charters is provided to the user. An example of using such controls are described in reference to blocks 701-707. Other controls (which can generally be referred to a "qualification/authorization controls") can include requiring a user to have, or obtain, a particular qualification or authorization, as described above. In some examples, the qualification/authorization controls may be applied to a session after a user selects a charter. If these controls are not met, the user may have the opportunity to provide the needed qualification or authorization as illustrated in FIG. 6. Accordingly, in such cases, a charter requiring a particular qualification or authorization may initially be provided to the user for selection, and after the charter is selected the system can be used to facilitate the user to meet the qualification or authorization required by the control. Other controls (which may generally be referred to as "data controls") may constrain access to data or control other data processing under a charter. The data controls can be associated with markings that are included in a charter object and a known user object. These three general categories of controls can be employed by an access service to control a group of users for data processing work using one or more resources under a charter.

In flowchart 700 at block 701, current session information of an authenticated known user is received. The current session information may include login data 315 (FIG. 3), or other information. At block 703, markings or corresponding data associated with the session information are determined. In an example, if the session is originated from inside the United States, a marking indicating a domestic session (e.g., "DMSTC") may be determined. In a second example, if the session is originated from a known computer, a marking indicating that the computer is known to the access system (e.g., "KNWN_CMPTR") may be determined.

At block 705, markings associated with the known user are determined. This may be performed, for example, by reading the control markings of a known user object associated with the authenticated known user. In an example, the known user may have an associated control marking indicating one or more clearance levels of the user (e.g., "CONF" and/or "CONF-LVL2"). In another example, the known user may have an associated control marking indicating a group or project the user is associated with (e.g., a legal group "LGL" and/or hiring group "HIRE" or a regional hiring group "HIRE-NYC").

At block 707, one or more charters are determined to be provided to the user for selection. The one or more charters can be determined by comparing control markings associated with a plurality of charter objects, and identifying which charter objects have corresponding markings to the markings associated with the session and the known user, such that all of the control markings of the charter object are also included in the known user object and/or are associated with markings of the user's session. In some embodiments, for a charter to be presented to a user for selection, the control markings associated with the user and the user's session include all of the control markings associated with the charter. While the totality of the control markings associated with the user and the user's session may be greater than those associated with a charter, at least all of the control markings of the charter are associated with the user and the current user's session. In some embodiments, markings of a charter that are associated with a user qualification or authorization may, or may not, initially be associated with a user (for example, in certain implementations when the user may be provided the opportunity to complete, or re-do, the qualification or authorization). Accordingly, in some embodiments, for a charter to be presented to a user for selection, a group of control markings associated with the user and the user's session include all of a group of control markings associated with the charter, where the group of markings does not include markings that are associated with qualifications or authorizations that the user may obtain before they can work under the charter. In such embodiments, while the totality of the control markings associated with the user and the user's session may be greater than those associated with a charter, at least all of the control markings of the charter are associated with the user and the current user's session, except for markings that a user may obtain relating to a qualification or an authorization. This is further described in reference to the example illustrated in FIG. 8. In the flowchart 700, block 707 proceeds to block 603 (FIG. 6) where information is transmitted to the user's computer identifying charters that are available for selection.

FIG. 8 illustrates an access system 800 for performing data processing under a charter. The access system uses a group of markings associated with a charter to define controls for data processing and resource access for users working under the charter. The markings can relate to control of data and resources accessed under the charter, and control of users who are allowed to work under the charter. A charter object 801 associated with the charter includes the group of markings. User objects associated with users also include markings. Markings may be related to a particular (login) session where a user desires to select a charter to work under, and access resources under the charter. To work under a charter, all of the markings associated with a charter must also be associated with the session and the user, or the user must be able to obtain the marking is part of obtaining a qualification or authorization. Such an access system can greatly simplify data processing project administration because to set up a project (charter) only the project rules/requirements need to be defined. In such a system, markings defined any particular user can be defined for each user as a separate administrator task. Also, changes to the controls/requirements of a charter for all users of the charter can be made in one place by changing markings associated with the charter, rather than changing individual permissions for a plurality of users.

In particular, FIG. 8 illustrates example models for instances of objects related to an instance of a known charter object. FIG. 8 includes an example instance "Hiring" 801 of a charter object related to a charter defined for hiring in the NY office. FIG. 8 also illustrates an example instance "Bob" 803 of a known user object, an example instance "Resumes" 805 of a resource object, an example instance "Tax_Docs" 807 of a resource object, an example instance "CPA" 809 of a qualification object, an example instance "DiversityTraining" 811 of a qualification object, an example instance "Confidential-Lvl2" 813 of a control object, an example instance "UserLocation" 815 of a control object, an example instance "NDA" 817 of a qualification object, and an example instance "Confidential" 819 of an control object, and an example instance "SessionTime" 821 of a control object. An instance Name of an object may be discussed herein by reference to the Name. Arrows are used in FIG. 8 to indicate examples of links. In various embodiments, the links can be implemented as asymmetrical links or as symmetrical links. In various embodiments, the links can be implemented with links 509 discussed with respect to FIG. 5. Link can be implemented through matching properties of objects, including control properties.

Each of the objects includes at least one control "marking" as indicated following the word "marking" or for brevity in the illustration, following "/M". For example, Confidntial-Lvl2 includes the marking CONF-LVL2, and Resumes includes the markings RESUMES, HIRE, LGL, DVRSTY, and CONF. The charter Hiring 801 includes a group of markings that define rules (e.g., controls, permissions, constraints, etc.) that govern access to resources when a user has selected the charter and is working under the charter. The markings of the charter include at least a portion of the totality of the markings of the linked instances (of objects).

A user may attempt to access resources of a computer system by providing a username and password. The provided username can be compared to the username of Bob 803, and the password can be (e.g., after encryption and/or decoding) compared to the stored password for Bob 803, such as described with respect to FIG. 4. By providing the correct username and password, the user can be authenticated as the known user Bob 803.

In this example, the charter Hiring 801 includes the group of markings HIRE, TXDOCS, RESUMES, CONF, CONF-LVL2, USCITZ, USLOC, WRKHRSEST, HIRE-NYC, WRKHRS, CPA, and DVRSTY. Of these markings, USLOC and WRKHRSEST relate to controlling user session parameters, e.g., UserLocation 805 and SessionTime 821, respectively. For example, the marking USLOC requires a session to be originated in the United States, and the marking WRKHRSEST requires a session to be originated during working hours Eastern Standard Time. The other markings, HIRE, TXDOCS, RESUMES, CONF, CONF-LVL2, USCITZ, HIRE-NYC, WRKHRS, CPA, and DVRSTY, relate to controls related to accessing resources associated with the charter Hiring 810. For example, HIRE relates to being a part of the hiring team. TXDOCS relates to a tax document resource that can be accessed for charter Hiring 801. RESUMES relates to a resume resource that can be accessed for charter Hiring 801. CONF and CONF-LVL2 relate to security access levels of resources associated with Hiring 801. USCITZ relates to being a US citizen. HIRE-NYC relates to being on a hiring team for hiring in New York City. CPA refers to a qualification is a CPA. DVRSTY relates to a qualification for diversity training. Bob 803, or another user, must have these same markings, or be able to obtain the same markings (e.g., in the case of a marking related to a qualification) to be able to access resources under the charter Hiring 801.

In this example, Bob 803 includes the markings HIRE, HIRE-NYC, LGL, RESUMES, TXDOCS, CONF, CONF-LVL2, CONF-LVL3, CONF-LVL4, USCITZ, and CPA. As described above, USLOC and WRKHRSEST relate to parameters of a user session. Comparing the other marking of Hiring 801 and Bob 803 shows that Bob 803 includes all of the markings of Hiring 801 except for DVRSTY, which relates to a diversity qualification. In this example, DVRSTY is a qualification that Bob 803 may obtain by "Complete Diversity Training Program at protocol://ad-dress.domain" as indicated in DiversityTrianing 811 (e.g., and as described in reference to FIG. 6). Thus, in this example, after the access system authenticates Bob 803, the system may present the charter Hiring 803 is a charter for the user Bob to select. Comparing the other markings of Hiring 801 and Bob 803 also shows that Bob 803 includes markings CONF-LVL3 and CONF-LVL4 that Hiring 801 does not include. This indicates that in this example Bob 803 has additional markings indicating additional permissions that are not required to work under the charter Hiring 801. The additional markings will not disqualify Bob 803 from work-ing under Hiring 801. However, because Hiring 801 indi-cates only CONF and CONF-LVL2, access to data under Hiring 801 is limited to data of the corresponding CONF and CONF-LVL2, even though Bob 803 has higher level accesses. For example, Tax_Docs 807 indicates that it has data at access levels corresponding to markings CONF, CONF-LVL2, and CONF-LVL3. Under the charter Hiring 801, Bob 803 will only have access to Tax Docs 807 data at a level of CONF and CONF-LVL2 even though Bob 803 has marking CONF-LVL3, because Hiring 801 only includes markings CONF and CONF-LVL2.

Whenever the user authenticated as Bob 803 access (and/or fails to access) any of the resources represented by instances 805 or 807, an auditing service can log the time of the access, that Bob was the user, the represented resource accessed, the selected charter, Bob's control markings, and Bob's qualifications related to the access. If Bob was denied access, then the reason for the denial, whether lack of authentication, lack of authorization, wrong use case, and/or insufficient qualifications can be logged.

Additional Example Uses

Using the technology and framework described herein, managing access to resources can be performed much faster. For example, a control such as "Confidential" can be applied to various resources that are confidential via a marking. It may be desirable to, at some point, change the access from what is shown in FIG. 8 (e.g., to a CONF qualification) such that only resource data of a confidential level can be accessed by the group of users working under Hiring. Without the framework described herein, an administrator having only authorization tools at his/her disposal will need to manually review every resource on the computer system to determine which resources are confidential, and for every confidential resource, ask each of the authorized users if they have the CONF-LVL2 qualification and, if so, edit the authorizations to remove access to the CONF-LVL2 for those users, and then manually edit the authorizations to add all of those users. Using the framework described herein an administrator can achieve the same result simply by remov-ing the CONF-LVL2 marking included in the charter object Hiring 801, which establishes that only CONF level data of a resource linked to the charter object can be accessed under the charter, regardless of the clearance level of the user. Whenever a categorical change is to be made, the linked charters and controls can be changed instead of re-identify-ing every resource and then manually editing authorizations for every user of a system.

User access can also be determined and managed based on purposes for why resources might be appropriately accessed and what qualifications groups of users should have when accessing resources for those purposes. An administrator may know, for example, that CPA's should be accessing tax documents but not personally know which of thousands or millions of users on a network have CPA degrees. Instead of asking each of the users whether or not they have a CPA degree and then manually editing the permissions of each tax document to specify which thou-sands out of the millions of users have authorizations, the administrator can create a CPA qualification object and direct users to upload proof of their CPA qualifications through a website to obtain access.

Charter-based access systems can be used to prevent breaches of privacy. There are times when users may be authorized to access resources, but the user should only access the resources under certain controls and/or for certain purposes. For example, a CEO of a company may have full authorization to resources that are files that include demo-graphic information about his employees. The CEO can work under a charter such as "Managing Employee Pay," and, with appropriate markings, the files including demo-graphic information will not be included as a resource for the charter so the CEO does not inadvertently access such files because pay should not be based on demographic back-grounds. When the CEO is instead working on diversity initiatives, the CEO work under a different charter having a different set of controls for accessing resources, such as "Diversity Initiative," and the CEO can be given access to the demographic information about the employees, but only those resources associated with the charter and only data from the resources at the security level dictated by a marking of the charter. This is different from a static authorization framework that does not implement charters—either the CEO would have access to the files including demographic information, or the CEO would not. Without the framework described herein, an administrator could not achieve the same result by manually changing resource authorizations—the administrator could not change the resource authoriza-tions for thousands or millions of resources at the same frequency that any of thousands or millions of users may change use cases for accessing resources.

Under the framework described herein, the reasons why individuals are accessing resources can be logged, and the accesses can be audited. Furthermore, the qualifications of the users who access the resources can also be audited to make sure that only qualified users are accessing resources.

In some embodiments, there can be hierarchies of quali-fications and/or authorizations. Some qualifications (such as a high level clearance) may automatically grant lower level qualifications. In some embodiments, hierarchies of resources can have different qualifications, and users can be required to satisfy qualifications associated with one level of resource in the hierarchy to gain access to the next level of resources in the hierarchy. Although a user may have a higher qualification, the access of particular data of a resource is controlled by the charter (e.g., a marking) and not the highest level of qualification (or authorization, access, etc.) of the user.

In some embodiments, the framework can be managed by administrators. The administrators can add or approve charters, controls, qualifications, authorizations, and resources, changes thereto, and/or links thereto. Managers may add and delete controls (e.g., indicated by a marking) from a charter effectively changing the users that have access to the resource and/or changing the access to the resource during a particular session.

An interface can be provided to filter the audit logs discussed herein. The filters can provide for searching and/or generating formatted reports for specific users, resources, qualifications, charters, login data, successful or unsuccessful accesses, or based on any other logged data. The reports can also include visualizations of the data such as graphs, histograms, charts, and the like.

Additional Implementation Details and Embodiments

In an implementation the access management system 308 (or one or more aspects of the access management system 308) may comprise, or be implemented in, a "virtual computing environment". As used herein, the term "virtual computing environment" should be construed broadly to include, for example, computer readable program instructions executed by one or more processors (e.g., as described in the example of FIG. 7) to implement one or more aspects of the modules and/or functionality described herein. Further, in this implementation, one or more modules/engines/ etc. of the access management system 308 may be understood as comprising one or more rules engines of the virtual computing environment that, in response to inputs received by the virtual computing environment, execute rules and/or other program instructions to modify operation of the virtual computing environment. For example, a request received from the user computing device 301 may be understood as modifying operation of the virtual computing environment to cause the request access to a resource from the access management system 308. Such functionality may comprise a modification of the operation of the virtual computing environment in response to inputs and according to various rules. Other functionality implemented by the virtual computing environment (as described throughout this disclosure) may further comprise modifications of the operation of the virtual computing environment, for example, the operation of the virtual computing environment may change depending on the information gathered by the access management system 308. Initial operation of the virtual computing environment may be understood as an establishment of the virtual computing environment. In some implementations the virtual computing environment may comprise one or more virtual machines, containers, and/or other types of emulations of computing systems or environments. In some implementations the virtual computing environment may comprise a hosted computing environment that includes a collection of physical computing resources that may be remotely accessible and may be rapidly provisioned as needed (commonly referred to as "cloud" computing environment).

Implementing one or more aspects of the access management system 308 as a virtual computing environment may advantageously enable executing different aspects or modules of the system on different computing devices or processors, which may increase the scalability of the system.

Implementing one or more aspects of the access management system 308 as a virtual computing environment may further advantageously enable sandboxing various aspects, data, or modules of the system from one another, which may increase security of the system by preventing, e.g., malicious intrusion into the system from spreading. Implementing one or more aspects of the access management system 308 as a virtual computing environment may further advantageously enable parallel execution of various aspects or modules of the system, which may increase the scalability of the system. Implementing one or more aspects of the access management system 308 as a virtual computing environment may further advantageously enable rapid provisioning (or de-provisioning) of computing resources to the system, which may increase scalability of the system by, e.g., expanding computing resources available to the system or duplicating operation of the system on multiple computing resources. For example, the system may be used by thousands, hundreds of thousands, or even millions of users simultaneously, and many megabytes, gigabytes, or terabytes (or more) of data may be transferred or processed by the system, and scalability of the system may enable such operation in an efficient and/or uninterrupted manner.

Various embodiments of the present disclosure may be a system, a method, and/or a computer program product at any possible technical detail level of integration. The computer program product may include a computer readable storage medium (or mediums) having computer readable program instructions thereon for causing a processor to carry out aspects of the present disclosure.

For example, the functionality described herein may be performed as software instructions are executed by, and/or in response to software instructions being executed by, one or more hardware processors and/or any other suitable computing devices. The software instructions and/or other executable code may be read from a computer readable storage medium (or mediums).

The computer readable storage medium can be a tangible device that can retain and store data and/or instructions for use by an instruction execution device. The computer readable storage medium may be, for example, but is not limited to, an electronic storage device (including any volatile and/or non-volatile electronic storage devices), a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a solid state drive, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions (as also referred to herein as, for example, "code," "instructions," "module," "application," "software application," and/or the like) for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. Computer readable program instructions may be callable from other instructions or from itself, and/or may be invoked in response to detected events or interrupts. Computer readable program instructions configured for execution on computing devices may be provided on a computer readable storage medium, and/or as a digital download (and may be originally stored in a compressed or installable format that requires installation, decompression or decryption prior to execution) that may then be stored on a computer readable storage medium. Such computer readable program instructions may be stored, partially or fully, on a memory device (e.g., a computer readable storage medium) of the executing computing device, for execution by the computing device. The computer readable program instructions may execute entirely on a user's computer (e.g., the executing computing device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart(s) and/or block diagram(s) block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. For example, the instructions may initially be carried on a magnetic disk or solid state drive of a remote computer. The remote computer may load the instructions and/or modules into its dynamic memory and send the instructions over a telephone, cable, or optical line using a modem. A modem local to a server computing system may receive the data on the telephone/cable/optical line and use a converter device including the appropriate circuitry to place the data on a bus. The bus may carry the data to a memory, from which a processor may retrieve and execute the instructions. The instructions received by the memory may optionally be stored on a storage device (e.g., a solid state drive) either before or after execution by the computer processor.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. In addition, certain blocks may be omitted in some implementations. The methods and processes described herein are also not limited to any particular sequence, and the blocks or states relating thereto can be performed in other sequences that are appropriate.

It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. For example, any of the processes, methods, algorithms, elements, blocks, applications, or other functionality (or portions of functionality) described in the preceding sections may be embodied in, and/or fully or partially automated via, electronic hardware such application-specific processors (e.g., application-specific integrated circuits (ASICs)), programmable processors (e.g., field programmable gate arrays (FPGAs)), application-specific circuitry, and/or the like (any of which may also combine custom hard-wired logic, logic circuits, ASICs, FPGAs, etc. with custom programming/execution of software instructions to accomplish the techniques).

Any of the above-mentioned processors, and/or devices incorporating any of the above-mentioned processors, may be referred to herein as, for example, "computers," "computer devices," "computing devices," "hardware computing devices," "hardware processors," "processing units," and/or the like. Computing devices of the above-embodiments may generally (but not necessarily) be controlled and/or coordinated by operating system software, such as Mac OS, iOS, Android, Chrome OS, Windows OS (e.g., Windows XP, Windows Vista, Windows 7, Windows 8, Windows 10, Windows Server, etc.), Windows CE, Unix, Linux, SunOS, Solaris, Blackberry OS, VxWorks, or other suitable operating systems. In other embodiments, the computing devices may be controlled by a proprietary operating system. Conventional operating systems control and schedule computer processes for execution, perform memory management, provide file system, networking, I/O services, and provide a user interface functionality, such as a graphical user interface ("GUI"), among other things.

Figure 9:
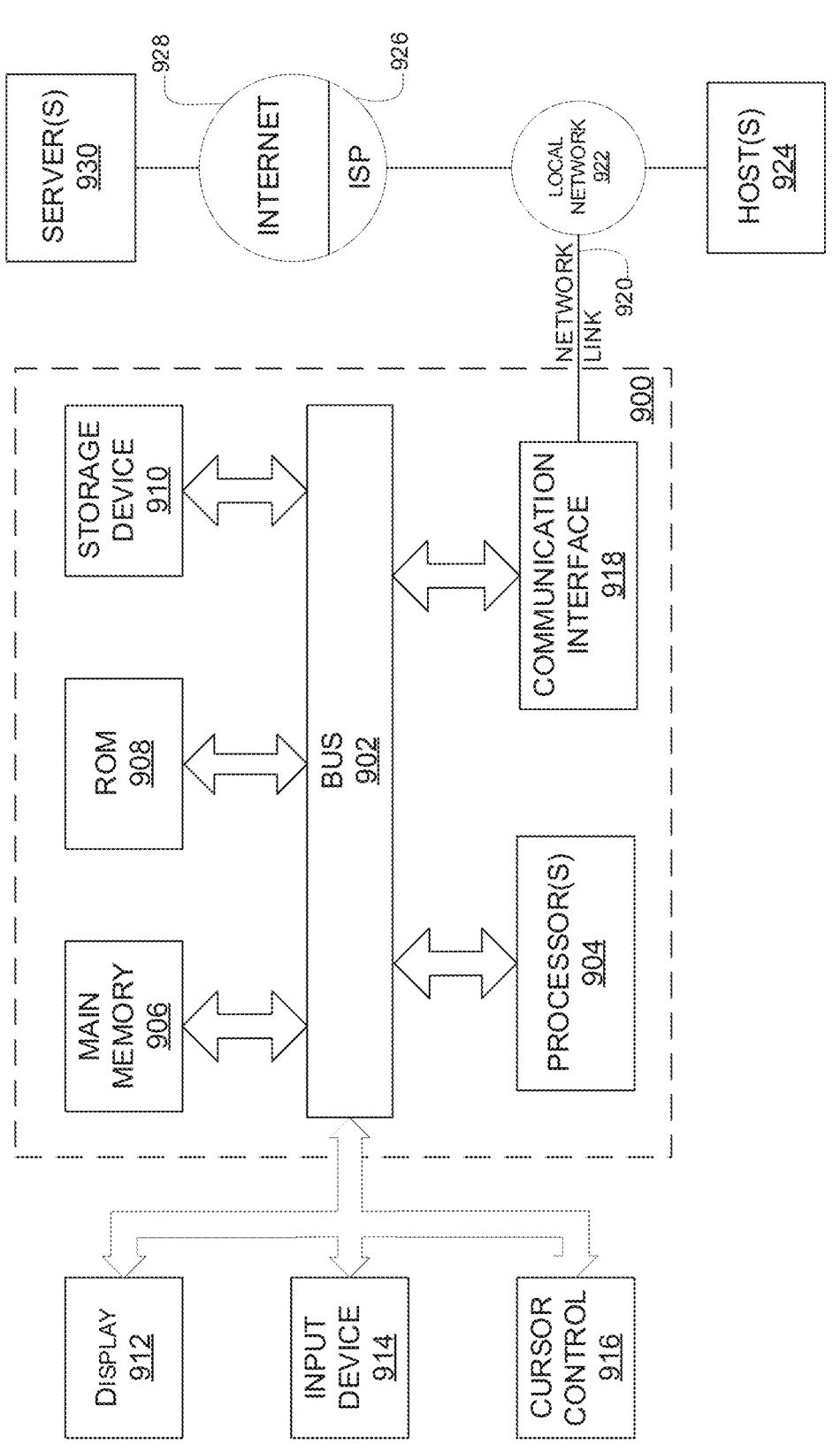
FIG. 9 shows a block diagram that illustrates a computer system upon which various embodiments may be implemented.

For example, FIG. 9 shows a block diagram that illustrates a computer system 900 upon which various embodiments may be implemented. Computer system 900 includes a bus 902 or other communication mechanism for communicating information, and a hardware processor, or multiple processors, 904 coupled with bus 902 for processing information. Hardware processor(s) 904 may be, for example, one or more general purpose microprocessors.

Computer system 900 also includes a main memory 906, such as a random access memory (RAM), cache and/or other dynamic storage devices, coupled to bus 902 for storing information and instructions to be executed by processor 904. Main memory 906 also may be used for storing temporary variables or other intermediate information during execution of instructions to be executed by processor 904. Such instructions, when stored in storage media accessible to processor 904, render computer system 900 into a special-purpose machine that is customized to perform the operations specified in the instructions.

Computer system 900 further includes a read only memory (ROM) 908 or other static storage device coupled to bus 902 for storing static information and instructions for processor 904. A storage device 910, such as a magnetic disk, optical disk, or USB thumb drive (Flash drive), etc., is provided and coupled to bus 902 for storing information and instructions.

Computer system 900 may be coupled via bus 902 to a display 912, such as a cathode ray tube (CRT) or LCD display (or touch screen), for displaying information to a computer user. An input device 914, including alphanumeric and other keys, is coupled to bus 902 for communicating information and command selections to processor 904. Another type of user input device is cursor control 916, such as a mouse, a trackball, or cursor direction keys for communicating direction information and command selections to processor 904 and for controlling cursor movement on display 912. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

Computing system 900 may include a user interface module to implement a GUI that may be stored in a mass storage device as computer executable program instructions that are executed by the computing device(s). Computer system 900 may further, as described below, implement the techniques described herein using customized hard-wired logic, one or more ASICs or FPGAs, firmware and/or program logic which in combination with the computer system causes or programs computer system 900 to be a special-purpose machine. According to one embodiment, the techniques herein are performed by computer system 900 in response to processor(s) 904 executing one or more sequences of one or more computer readable program instructions contained in main memory 906. Such instructions may be read into main memory 906 from another storage medium, such as storage device 910. Execution of the sequences of instructions contained in main memory 906 causes processor(s) 904 to perform the process steps described herein. In alternative embodiments, hard-wired circuitry may be used in place of or in combination with software instructions.

Various forms of computer readable storage media may be involved in carrying one or more sequences of one or more computer readable program instructions to processor 904 for execution. For example, the instructions may initially be carried on a magnetic disk or solid state drive of a remote computer. The remote computer can load the instructions into its dynamic memory and send the instructions over a telephone line using a modem. A modem local to computer system 900 can receive the data on the telephone line and use an infra-red transmitter to convert the data to an infra-red signal. An infra-red detector can receive the data carried in the infra-red signal and appropriate circuitry can place the data on bus 902. Bus 902 carries the data to main memory 906, from which processor 904 retrieves and executes the instructions. The instructions received by main memory 906 may optionally be stored on storage device 910 either before or after execution by processor 904.

Computer system 900 also includes a communication interface 918 coupled to bus 902. Communication interface 918 provides a two-way data communication coupling to a network link 920 that is connected to a local network 922. For example, communication interface 918 may be an integrated services digital network (ISDN) card, cable modem, satellite modem, or a modem to provide a data communication connection to a corresponding type of telephone line. As another example, communication interface 918 may be a local area network (LAN) card to provide a data communication connection to a compatible LAN (or WAN component to communicated with a WAN). Wireless links may also be implemented. In any such implementation, communication interface 918 sends and receives electrical, electromagnetic or optical signals that carry digital data streams representing various types of information.

Network link 920 typically provides data communication through one or more networks to other data devices. For example, network link 920 may provide a connection through local network 922 to a host computer 924 or to data equipment operated by an Internet Service Provider (ISP) 926. ISP 926 in turn provides data communication services through the world wide packet data communication network now commonly referred to as the "Internet" 928. Local network 922 and Internet 928 both use electrical, electromagnetic or optical signals that carry digital data streams.

The signals through the various networks and the signals on network link 920 and through communication interface 918, which carry the digital data to and from computer system 900, are example forms of transmission media.

Computer system 900 can send messages and receive data, including program code, through the network(s), network link 920 and communication interface 918. In the Internet example, a server 930 might transmit a requested code for an application program through Internet 928, ISP 926, local network 922 and communication interface 918.

The received code may be executed by processor 904 as it is received, and/or stored in storage device 910, or other non-volatile storage for later execution.

As described above, in various embodiments certain functionality may be accessible by a user through a web-based viewer (such as a web browser), or other suitable software program). In such implementations, the user interface may be generated by a server computing system and transmitted to a web browser of the user (e.g., running on the user's computing system). Alternatively, data (e.g., user interface data) necessary for generating the user interface may be provided by the server computing system to the browser, where the user interface may be generated (e.g., the user interface data may be executed by a browser accessing a web service and may be configured to render the user interfaces based on the user interface data). The user may then interact with the user interface through the web-browser. User interfaces of certain implementations may be accessible through one or more dedicated software applications. In certain embodiments, one or more of the computing devices and/or systems of the disclosure may include mobile computing devices, and user interfaces may be accessible through such mobile computing devices (for example, smartphones and/or tablets).

Many variations and modifications may be made to the above-described embodiments, the elements of which are to be understood as being among other acceptable examples. All such modifications and variations are intended to be included herein within the scope of this disclosure. The foregoing description details certain embodiments. It will be appreciated, however, that no matter how detailed the foregoing appears in text, the systems and methods can be practiced in many ways. As is also stated above, it should be noted that the use of particular terminology when describing certain features or aspects of the systems and methods should not be taken to imply that the terminology is being re-defined herein to be restricted to including any specific characteristics of the features or aspects of the systems and methods with which that terminology is associated.

Conditional language, such as, among others, "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The term "substantially" when used in conjunction with the term "real-time" forms a phrase that will be readily understood by a person of ordinary skill in the art. For example, it is readily understood that such language will include speeds in which no or little delay or waiting is discernible, or where such delay is sufficiently short so as not to be disruptive, irritating, or otherwise vexing to a user.

Conjunctive language such as the phrase "at least one of X, Y, and Z," or "at least one of X, Y, or Z," unless specifically stated otherwise, is to be understood with the context as used in general to convey that an item, term, etc. may be either X, Y, or Z, or a combination thereof. For example, the term "or" is used in its inclusive sense (and not in its exclusive sense) so that when used, for example, to connect a list of elements, the term "or" means one, some, or all of the elements in the list. Thus, such conjunctive language is not generally intended to imply that certain embodiments require at least one of X, at least one of Y, and at least one of Z to each be present.

The term "a" as used herein should be given an inclusive rather than exclusive interpretation. For example, unless specifically noted, the term "a" should not be understood to mean "exactly one" or "one and only one"; instead, the term "a" means "one or more" or "at least one," whether used in the claims or elsewhere in the specification and regardless of uses of quantifiers such as "at least one," "one or more," or "a plurality" elsewhere in the claims or specification.

The term "comprising" as used herein should be given an inclusive rather than exclusive interpretation. For example, a general purpose computer comprising one or more processors should not be interpreted as excluding other computer components, and may possibly include such components as memory, input/output devices, and/or network interfaces, among others.

While the above detailed description has shown, described, and pointed out novel features as applied to various embodiments, it may be understood that various omissions, substitutions, and changes in the form and details of the devices or processes illustrated may be made without departing from the spirit of the disclosure. As may be recognized, certain embodiments of the inventions described herein may be embodied within a form that does not provide all of the features and benefits set forth herein, as some features may be used or practiced separately from others. The scope of certain inventions disclosed herein is indicated by the appended claims rather than by the foregoing description. All changes which come within the meaning and range of equivalency of the claims are to be embraced within their scope.

What is claimed is:

1. A computer system comprising:
   one or more computer-readable storage devices configured to store computer-readable instructions; and
   one or more processors configured to execute the computer-readable instructions to cause the computer system to:
   provide, to a first user, indications of one or more charters, wherein the one or more charters are linked to respective sets of computer resources, respective sets of controls, and respective qualifications;
   in response to receiving a selection of a first charter of the one or more charters, determine that qualifications associated with the first user satisfy a first qualification linked to the first charter, wherein the first qualification is a credential the first user must satisfy before gaining access to a first set of computer resources linked to the first charter; and
   in response to determining that the qualifications associated with the first user satisfy the first qualification, provide the first user access to the first set of computer resources to operate in accordance with a first set of controls linked to the first charter, wherein the first set of controls is a subset of all controls authorized for the first user.

2. The computer system of claim 1, wherein at least a portion of the first set of controls control access to the first set of computer resources under the first charter based on parameters of a session of the first user at a time the first user is trying to access the first set of computer resources.

3. The computer system of claim 2, wherein at least a portion of the first set of controls control access to the first set of computer resources under the first charter based on a geographic location of the session of the first user.

4. The computer system of claim 2, wherein at least a portion of the first set of controls control access to first set of computer resources under the first charter based on the time of the session of the first user.

5. The computer system of claim 2, wherein at least a portion of the first set of controls control access to the first set of computer resources under the first charter based on identification of a computer being used by the first user for the session.

6. The computer system of claim 1, wherein the first set of computer resources includes at least one of: a file, a folder, a dataset, a database, a memory, a processor, a drive, a storage device, a computer, a laptop, or a phone.

7. The computer system of claim 1, wherein the first qualification is training that the first user must complete before gaining access to the first set of computer resources.

8. The computer system of claim 1, wherein the one or more processors are configured to execute the computer-readable instructions to further cause the computer system to:

determine if authorizations of the first user satisfy a first agreement associated with the first charter; and in response to determining that the authorizations of the first user do not include the first agreement, deny providing the first user access to the first set of computer resources, and transmit data to the first user indicating how to obtain the first agreement.

9. The computer system of claim 1, wherein the one or more processors are configured to execute the computer-readable instructions to further cause the computer system to:

receive, from the first user, authorization information;

determine, based at least in part on the authorization information, that authorizations of the first user satisfy a first authorization associated with the first charter; and provide the first user access to the first set of computer resources based at least in part on the determination that the authorizations of the first user satisfy the first authorization.

10. The computer system of claim 9, wherein the first authorization is a condition that the first user must agree to before being granted access to the first set of computer resources during a session.

11. The computer system of claim 1, wherein operations of the first user when accessing the first set of computer resources during a session are constrained by a control object linked to the first charter to prohibit combining information from a first computer resource and a second computer resource into the first computer resource, the second computer resource, or a third computer resource.

12. The computer system of claim 1, wherein the first charter is associated with audit rules that are applied to resource objects linked to the first charter, the audit rules controlling data collecting and retention for work conducted by a user under the first charter.

13. The computer system of claim 1, at least one of the first set of controls indicate a purpose of the first charter.

14. The computer system of claim 1, wherein the first qualification is an agreement the first user needs to sign before gaining access to the set of computer resources associated with the first charter.

15. The computer system of claim 1, wherein the first qualification is an approval by a data owner that the first user needs to obtain before gaining access to the first set of computer resources associated with the first charter.

16. A computer-implemented method comprising, by one or more processors executing program instructions:

providing, to a first user, indications of one or more charters, wherein the one or more charters are linked to respective sets of computer resources, respective sets of controls, and respective qualifications;

in response to receiving a selection of a first charter of the one or more charters, determining that qualifications associated with the first user satisfy a first qualification linked to the first charter, wherein the first qualification is a credential the first user must satisfy before gaining access to a first set of computer resources linked to the first charter; and in response to determining that the qualifications associated with the first user satisfy the first qualification, providing the first user access to the first set of computer resources to operate in accordance with a first set of controls linked to the first charter, wherein the first set of controls is a subset of all controls authorized for the first user.

17. The computer-implemented method of claim 16, wherein at least a portion of the first set of controls control access to the first set of computer resources under the first charter based on parameters of a session of the first user at a time the first user is trying to access the first set of computer resources.

18. The computer-implemented method of claim 16, wherein the first qualification is training that the first user must complete before gaining access to the first set of computer resources.

19. The computer-implemented method of claim 16 further comprising, by one or more processors executing program instructions:

determining if authorizations of the first user satisfy a first agreement associated with the first charter; and in response to determining that the authorizations of the first user do not include the first agreement, denying providing the first user access to the first set of computer resources, and transmit data to the first user indicating how to obtain the first agreement.

20. A computer program product comprising one or more computer-readable storage mediums having program instructions embodied therewith, the program instructions executable by one or more processors to cause the one or more processors to:

provide, to a first user, indications of one or more charters, wherein the one or more charters are linked to respective sets of computer resources, respective sets of controls, and respective qualifications;

in response to receiving a selection of a first charter of the one or more charters, determine that qualifications associated with the first user satisfy a first qualification linked to the first charter, wherein the first qualification is a credential the first user must satisfy before gaining access to a first set of computer resources linked to the first charter; and in response to determining that the qualifications associated with the first user satisfy the first qualification, provide the first user access to the first set of computer resources to operate in accordance with a first set of controls linked to the first charter, wherein the first set of controls is a subset of all controls authorized for the first user.

* * * * *